United States Patent
Pattan et al.

(10) Patent No.: US 10,049,659 B2
(45) Date of Patent: Aug. 14, 2018

(54) METHOD AND SYSTEM FOR PROVIDING VISUAL INTERACTIVE VOICE RESPONSE (IVR) TO AN ENHANCED VISUAL CALL (EVC) CLIENT DEVICE

(71) Applicant: Samsung Electronics Co., Ltd., Gyeonggi-do (KR)

(72) Inventors: Basavaraj Jayawant Pattan, Bangalore (IN); Nishant Gupta, Bangalore (IN); Suresh Chitturi, Bangalore (IN); Ashok Kumar Selvaraj, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/529,910

(22) PCT Filed: Nov. 25, 2015

(86) PCT No.: PCT/KR2015/012737
§ 371 (c)(1),
(2) Date: May 25, 2017

(87) PCT Pub. No.: WO2016/085258
PCT Pub. Date: Jun. 2, 2016

(65) Prior Publication Data
US 2017/0330557 A1 Nov. 16, 2017

(30) Foreign Application Priority Data

Nov. 25, 2014 (IN) ............................ 5906/CHE/2014
Nov. 24, 2015 (IN) ............................ 5907/CHE/2014

(51) Int. Cl.
*H04M 11/00* (2006.01)
*G10L 15/08* (2006.01)
(Continued)

(52) U.S. Cl.
CPC .......... *G10L 15/08* (2013.01); *G06F 3/04817* (2013.01); *G06F 17/21* (2013.01);
(Continued)

(58) Field of Classification Search
CPC ........... H04M 3/493; H04M 2203/254; H04M 2203/251; H04M 2203/252
See application file for complete search history.

(56) References Cited

U.S. PATENT DOCUMENTS 7,813,485 B2   10/2010   Yin et al.
8,600,018 B2   12/2013   Gao et al.
(Continued)

OTHER PUBLICATIONS

International Search Report dated Mar. 22, 2016 in connection with International Patent Application No. PCT/KR2015/012737.
(Continued)

*Primary Examiner* — Stella Woo

(57) ABSTRACT

The present invention describes a method and system for providing visual interactive voice response (IVR) to an enhanced visual call (EVC) client device. The method comprises of receiving, by an EVC server, a request from the EVC client device for providing the visual IVR content, mapping a current webpage URL and an EVC user input with a subsequent webpage URL and an input value stored in a EVC XDM server, receiving, by the EVC client device, a webpage URL associated with the visual IVR content stored on a content server, retrieving the visual IVR content associated with the subsequent webpage URL, providing the EVC user input received from the EVC server to the IVR system, synchronizing the retrieved visual IVR content with a corresponding audio from the IVR system and presenting the synchronized visual IVR content and the corresponding audio from the IVR system, simultaneously on the EVC client device.

28 Claims, 26 Drawing Sheets

(51) Int. Cl.
*G06Q 50/10* (2012.01)
*G06Q 50/30* (2012.01)
*G06F 3/0481* (2013.01)
*G06F 17/21* (2006.01)
*G06F 17/30* (2006.01)

(52) U.S. Cl.
CPC ....... *G06F 17/30401* (2013.01); *G06Q 50/10* (2013.01); *G06Q 50/30* (2013.01)

(56) References Cited

U.S. PATENT DOCUMENTS

| | | |
|---|---|---|
| 2006/0285662 A1 | 12/2006 | Yin et al. |
| 2007/0135101 A1 | 6/2007 | Ramati et al. |
| 2009/0132487 A1 | 5/2009 | Lev |
| 2009/0149158 A1* | 6/2009 | Goldfarb ............. H04L 65/4061 455/414.1 |
| 2011/0299523 A1 | 12/2011 | Brown et al. |
| 2012/0257002 A1 | 10/2012 | Stocker |
| 2014/0126715 A1* | 5/2014 | Lum ................... H04M 3/5133 379/265.09 |
| 2014/0254437 A1 | 9/2014 | Koch et al. |
| 2015/0020027 A1* | 1/2015 | Jwa ................... G06F 17/30867 715/811 |
| 2015/0237189 A1* | 8/2015 | Schultz ................ H04M 3/4211 455/414.1 |

OTHER PUBLICATIONS

Written Opinion of the International Searching Authority dated Mar. 22, 2016 in connection with International Patent Application No. PCT/KR2015/012737.

* cited by examiner

| CurrentWebURL | NextWebURL | DTMF | Text (processed from Speech) |
|---|---|---|---|
| - | ../DominosIndex.html | - | - |
| ../DominosIndex.html | ../NewOrder.html | 1 | New Order |
| ../DominosIndex.html | ../TrackOrder.html | 2 | Track Order |
| ../DominosIndex.html | ../Offers.html | 3 | Offers |
| ../DominosIndex.html | ../Feedback.html | 4 | Feedback |
| ../DominosIndex.html | ../Support | 0 | Customer Care |
| ../NewOrder.html | ../NewOrder_Pizza.html | 1 | Pizza |
| ../NewOrder.html | ../NewOrder_Breads.html | 2 | Breads |
| ... | ... | ... | ... |

FIG.13

| Organization/Business | Type of IVR |
|---|---|
| 18002541234 | DTMF Only |
| +91987654321 | Voice Only |
| 18008521800 | Hybrid |
| 18001237850 | Hybrid |
| ... | ... |

FIG.14

METHOD AND SYSTEM FOR PROVIDING VISUAL INTERACTIVE VOICE RESPONSE (IVR) TO AN ENHANCED VISUAL CALL (EVC) CLIENT DEVICE

CROSS-REFERENCE TO RELATED APPLICATIONS

This application is a National Phase Entry of PCT International Application No. PCT/KR2015/012737, which was filed on Nov. 25, 2015, and claims priority to Indian Patent Application No. 5906/CHE/2014, which was filed on Nov. 25, 2014, Indian Patent Application No. 5907/CHE/2014, which was filed on Nov. 25, 2014, and Indian Patent Application No. 5907/CHE/2014, which was filed on Nov. 24, 2015, the contents of which are incorporated herein by reference.

TECHNICAL FIELD

The present invention generally relates to the field of communication systems and more particularly related to interactive voice response (IVR) Call. Specifically, the invention relates to a method and system for providing visual interactive voice response (VIVR) to an enhanced visual call (EVC) client device.

BACKGROUND

In the art of telephony, there are call centers that specialize in processing telephone calls. A state-of-art call center has access to a central telephone switch and local area network (LAN) supporting telephony equipment such as telephones, computing appliances, servers, and the like. In most such call centers, an interactive voice response (IVR) unit is accessible to the center for intercepting calls destined for the center.

The IVR unit is typically adapted for customer self-service. Further, IVR units may be used to screen callers for routing to live agents within the call center or working remotely from the center but connected to the center by a wireless or wired carrier network. In IVR interaction, a voice application is played for the caller and the caller interacts with menu options that the caller hears the voice platform play.

SUMMARY

The current Enterprise IVR system understands only voice or DTMF input to the audio IVR menu presented to the user. The current IVR systems are limited to computer generated voice menu and Voice/DTMF input to cater services to the user. Interaction with such enunciated voice menus can be difficult. This is partly due to confusion because of the recitation of many options presented serially to the caller through the voice interface. Often a caller must replay the menu and listen to the available options again and again before selecting one. This creates delay in the system that could lead to delay in call processing and to reduction of call processing efficiency.

Thus, there is need for a method and system that can address the above issues by presenting the user with a visual IVR similar to a web-page alongside the audio IVR, where the user can navigate through the visual menu, provide input etc. to the business.

Technical Solution

Various embodiments herein describe a method and system for providing visual interactive voice response (IVR) to an enhanced visual call (EVC) client device. In one embodiment, the method comprises of receiving, by an EVC server, a request from the EVC client device for providing the visual IVR content, wherein the request comprises information of a called Interactive Voice Response (IVR) system, current webpage Uniform Resource Locator (URL) and an EVC user input, mapping, by the EVC server, the received information on the called IVR system, the current webpage URL and the EVC user input with at least one of a subsequent webpage uniform resource locator (URL) and an input value stored in a EVC XDM server; receiving, by the EVC client device, a subsequent webpage URL associated with the visual IVR content stored on a content server or an input value for the IVR system from the EVC server, retrieving, by the EVC client device, the visual IVR content associated with the webpage URL from the content server, providing, by the EVC client device, the EVC user input or the input value received from the EVC server, to the IVR system, synchronizing the retrieved visual IVR content with a corresponding audio from the IVR system, and presenting the synchronized visual IVR content and the corresponding audio from the IVR system, simultaneously on the EVC client device.

According to one embodiment, the current webpage URL is NULL or void and the EVC user input is NULL or void.

According to one embodiment, the method further comprises of receiving, by the EVC server, a request from the EVC client device for providing a subsequent visual IVR content, wherein the request comprises of details of the called interactive voice response system, current webpage uniform resource locator (URL) and one or more options selected by the EVC user, mapping, by the EVC server, the received information on the called IVR system, the current webpage URL and the EVC user input with the second webpage uniform resource locator (URL) and an input value stored in a EVC XDM server, receiving, by the EVC client device, a webpage URL associated with the visual IVR content stored on a content server; retrieving, by the EVC client, subsequent visual IVR content associated with a second webpage URL based on the one or more options selected by the EVC user, providing, by the EVC client, the input received from the EVC user or the EVC server to the IVR system, synchronizing the subsequent visual IVR content with a corresponding audio IVR, and rendering the synchronized visual IVR content along with the corresponding audio IVR on the EVC client device.

According to one embodiment, the EVC user input comprises of one or more options for enabling a user to interact or navigate through the visual IVR, wherein the EVC user input comprises of a Dual Tone Multi Frequency (DTMF) tone input, a voice input, and/or a web click input.

According to one embodiment, the IVR system supported by the EVC system comprises of an IVR system capable of handling a DTMF tone, an IVR system capable of handling a Voice tone, and an IVR system capable of handling both DTMF tone and voice tone.

According to one embodiment, in mapping the received details of the called interactive response system, current webpage URL and the EVC user input with the visual IVR content, the method comprises of receiving, by a EVC XDM Server, a request from the EVC server for obtaining the visual interactive voice response content, retrieving, the mapping information, related to the IVR system and EVC user input pre-stored in a mapping table, and transmitting the mapping information to the EVC server.

According to one embodiment, the mapping table comprises of the current webpage URL corresponding to the current visual IVR content displayed to the EVC user and the subsequent webpage URL pointing to the next VIVR content to be displayed to the EVC user on input of one of a DTMF Code or a mapping text for retrieving a corresponding audio content or web content.

According to one embodiment, the method further comprises of allowing the EVC user to share web content while triggering an IVR call.

According to one embodiment, the method of sharing web content while triggering the IVR call comprises of fetching, by a first EVC client device, a landing webpage associated with a second EVC user for accessing a landing webpage associated with the second EVC user, updating, by the first EVC client device, the landing webpage content associated with the second EVC user, obtaining, by the first EVC client device, a reference ID or uniform resource locator (URL) for the updated webpage content, initiating, by the first EVC client device, an enriched call setup for sharing the reference ID or URL obtained for the updated web content, extracting, by a second EVC client device, call correlation information and EVC data including reference ID for the webpage content accessed by the first EVC client device, obtaining, by a second EVC client device, the enriched content from a content server based on the reference ID, and correlating, by a second EVC client device, enriched content and the call and providing the correlated enriched content and call to the second EVC user.

According to one embodiment, in the step of updating web content the method comprises of allowing the first EVC user to fill one or more details provided in the landing webpage content associated with the second EVC user.

Various embodiments herein further describe a system for providing Visual Interactive Voice Response (VIVR) content to an Enhanced Visual Call (EVC) client device. According to one embodiment, the system comprises an EVC client running on an EVC client device adapted to access an EVC server for requesting visual interactive voice response (VIVR), an EVC server adapted for: receiving, by an EVC server, a request from the EVC client device for providing the visual IVR content, wherein the request comprises information of a called Interactive Voice Response (IVR) system, current webpage Uniform Resource Locator (URL) and an EVC user input, mapping, by the EVC server, the received information on the called IVR system, the current webpage URL and the EVC user input with at least one of a subsequent webpage uniform resource locator (URL) or an input value stored in a EVC XDM server, receiving, by the EVC client device, a webpage URL associated with the visual IVR content stored on a content server or an input value for the IVR system from the EVC XDM server, retrieving, by the EVC client device, the visual IVR content associated with the webpage URL from the content server, providing, by the EVC client device, the EVC user input or the input value received from the EVC server, to the IVR system, synchronizing the retrieved visual IVR content with a corresponding audio from the IVR system, and presenting the synchronized visual IVR content and the corresponding audio from the IVR system, simultaneously on the EVC client device.

BRIEF DESCRIPTION OF THE DRAWINGS

The other objects, features and advantages will occur to those skilled in the art from the following description of the preferred embodiment and the accompanying drawings in which:

FIG. 13 illustrates an exemplary mapping table stored in an EVC XDM Server for providing visual IVR content to an EVC client device, according to one embodiment;

FIG. 14 is a tabular diagram illustrating exemplary types of inputs supported by a traditional IVR system, according to one embodiment;

Although specific features of the present invention are shown in some drawings and not in others. This is done for convenience only as each feature may be combined with any or all of the other features in accordance with the present invention.

DETAILED DESCRIPTION

The present invention provides a method and system for providing visual IVR content to an enhanced voice call (EVC) client device. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
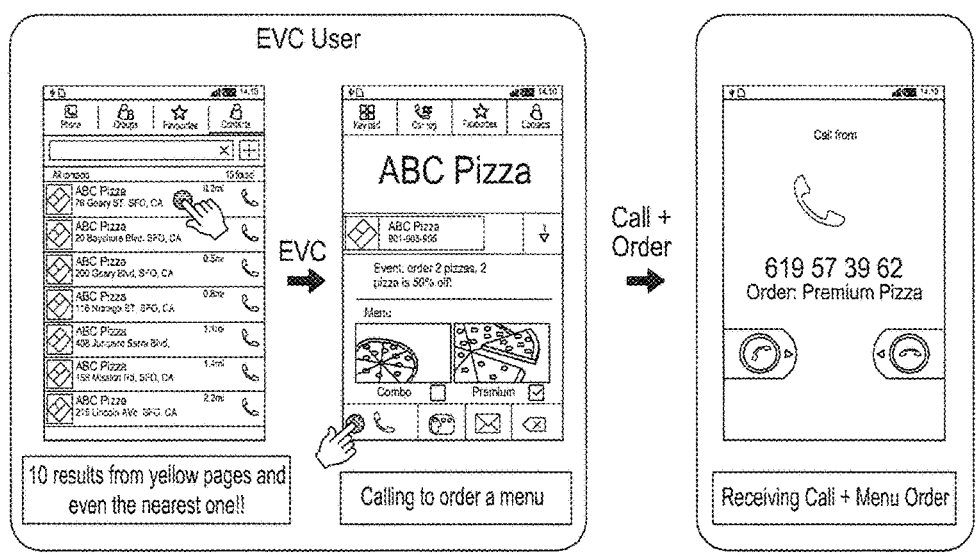
FIG. 1 is a schematic diagram illustrating an exemplary use of website-like visual content presented to an EVC user, according to one embodiment.

FIG. 1 is a schematic diagram illustrating an exemplary use of website-like visual content presented to an EVC user, according to one embodiment. As shown in FIG. 1, consider the EVC user is placing an order for pizza from Dominos. The user is presented with the menu choice after selecting one store (choice can be based on multiple factors, distance in this case). The EVC user can decide and select the order using the visual interface before making an actual call to the call center to place the order. And, when the user calls, the order information is shared with the domino's, which then is correlated with the incoming call and is presented to the operator even before the call is answered. Thus the invention provides a way to share visual information relevant to the call at the time of call setup.

Figure 2:
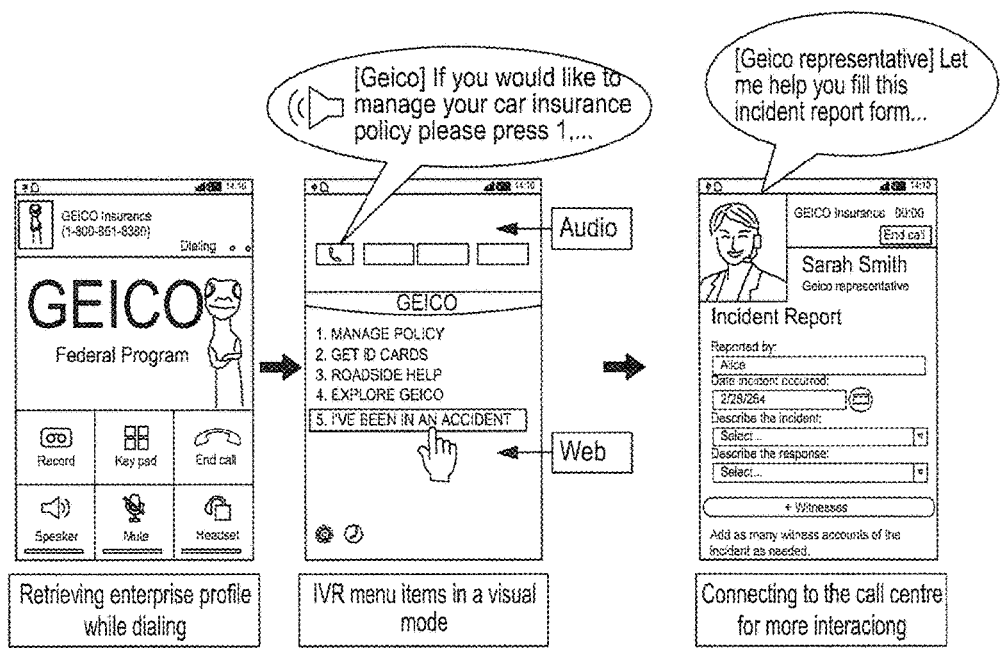
FIG. 2 is a schematic diagram illustrating an exemplary visual interactive voice response (VIVR) provided in synchronization with an audio IVR to a user, according to one embodiment.

FIG. 2 is a schematic diagram illustrating an exemplary visual interactive voice response (VIVR) provided in synchronization with an audio IVR to a user, according to one embodiment. In this embodiment, when the user dials a customer care number of a company, a visual IVR is presented along with the traditional audio IVR. The visual IVR enables a user to quickly decide on the options provided visually rather than waiting for the completion of recitation/enunciation of voice IVR. The Visual IVR provides a customer friendly interface and reduces the customer time in completing their desired task/query. For example, consider that a user wants to report an insurance company about being involved in an accident. So the user dials the insurance company number. Upon connecting to the insurance company IVR (Interactive Voice Response), the user starts hearing a voice menu and as well as sees the same menu items as visual menu. The same is illustrated in FIG. 2. Thus, the user is provided with an option of interacting with the IVR menu either via voice or selection on the visual menu. If the user selects the item to report an accident, the IVR system connects him/her to a representative while continuing to display the web page and further allowing the user to interact with the web page being displayed. For example, the insurance company representative can assist the user to complete the necessary online forms to report an accident. Once, the form is filled the user may get confirmation about filing the accident report. The present invention allows the user to get the available IVR menu items in a visual mode and he/she can select the desired IVR menu item without waiting for completion of the audio IVR.

In one embodiment, the visual IVR is provided to the user using an enhanced voice call (EVC) server and audio IVR is provided using a traditional IVR server. In another embodiment, both the visual and voice IVR can be provided to the user using the EVC server.

Figure 3:
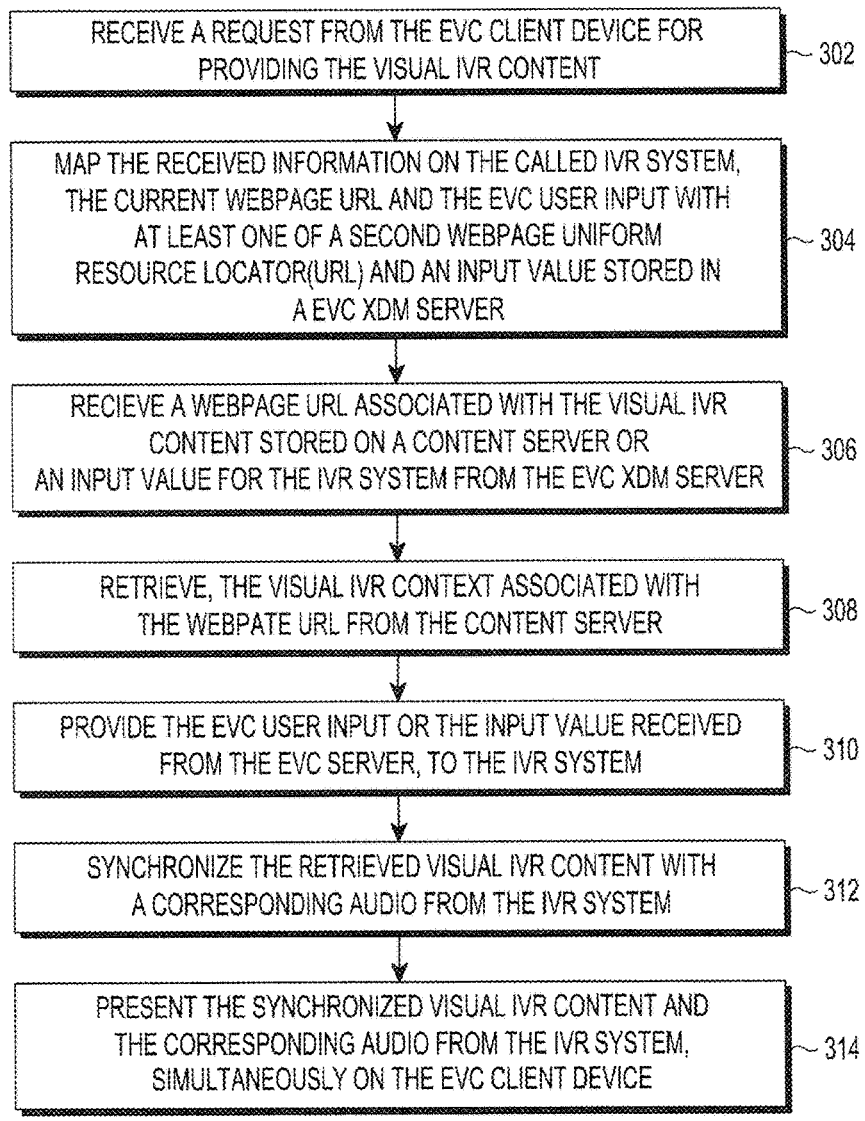
FIG. 3 is a flowchart illustrating an exemplary method for providing visual IVR content to an EVC client device, according to one embodiment.

FIG. 3 is a flowchart illustrating an exemplary method for providing visual IVR content to an EVC client device, according to one embodiment. At step 302, a request from the EVC client device for providing the visual IVR content is received by an EVC server. The request comprises information of a called Interactive Voice Response (IVR) system, first webpage Uniform Resource Locator (URL) and an EVC user input. At step 304, the received information on the called IVR system, the current webpage URL and the EVC user input is mapped with at least one of a subsequent webpage uniform resource locator (URL) and an input value stored in an EVC XDM server. At step 306, a webpage URL associated with the visual IVR content stored on a content server or an input value for the IVR system from the EVC XDM server is received by an EVC client device. At step 308, the visual IVR content associated with the webpage URL from the content server is retrieved by the EVC client device. An EVC user input or the input value received from the EVC server, to the IVR system is provided by the EVC client device at step 310. At step 312, the retrieved visual IVR content with a corresponding audio from the IVR system is synchronized and then at step 314 the synchronized visual IVR content and the corresponding audio from the IVR system is presented simultaneously on the EVC client device.

Figure 4:
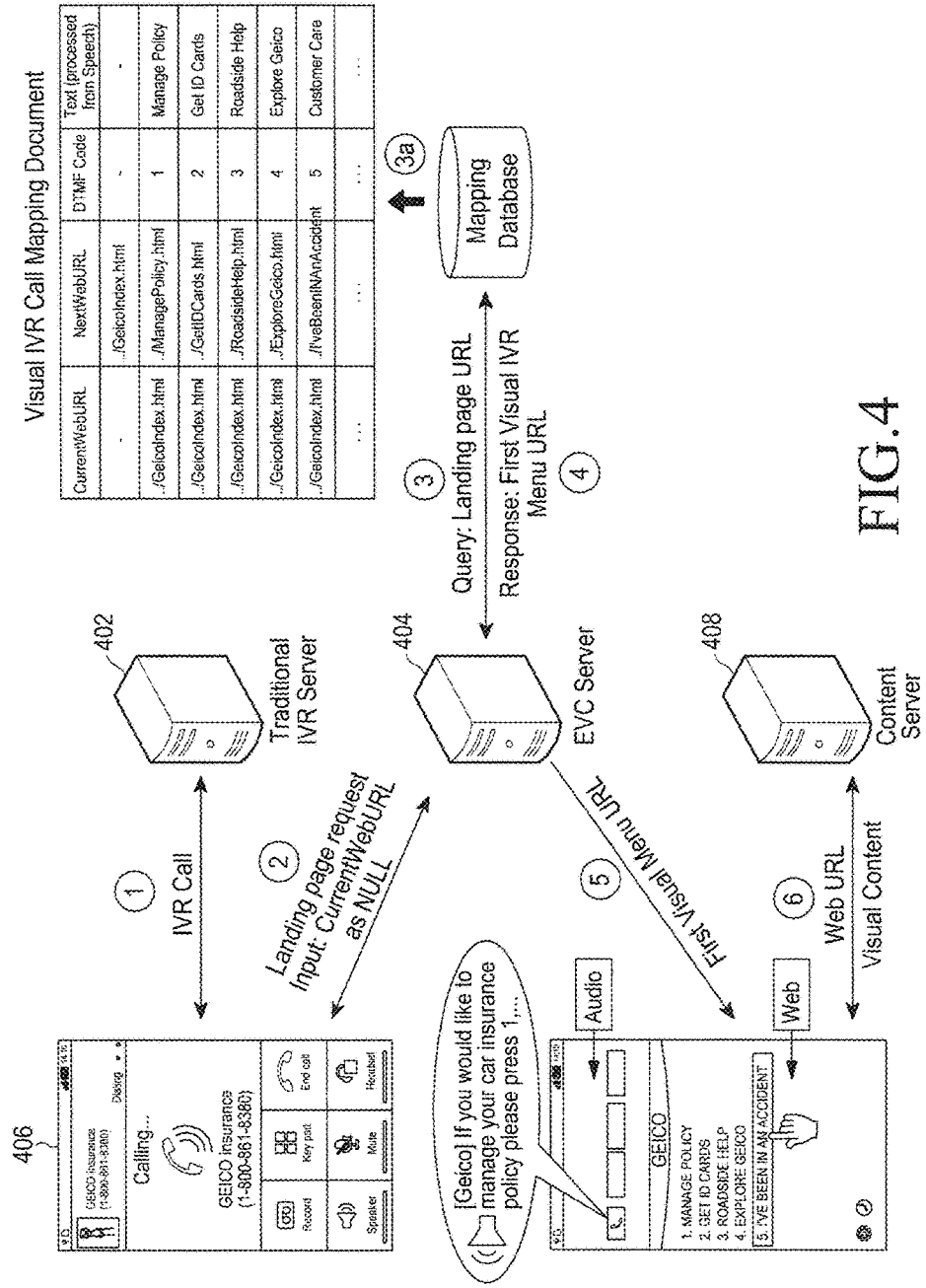
FIG. 4 is a system diagram illustrating one or more components for providing a visual interactive voice response (IVR) along with an audio IVR to an EVC client device, according to one embodiment.

FIG. 4 is a system diagram illustrating one or more components for providing a visual interactive voice response (IVR) along with an audio IVR to an EVC client device, according to one embodiment. The system consists of a traditional IVR server 402, an enhanced voice call (EVC) server 404, a content server 408 and an EVC client device 406. The EVC server 404 further comprises of a XDM server having a mapping database 410 for mapping visual content associated with an input provided by a user.

The traditional IVR server 402 is responsible for providing audio IVR services to a user. The interaction between the traditional IVR server 402 and the user mainly occurs based on voice input or dual tone multi frequency (DTMF) input provided by the user. The EVC server 404 is responsible for providing mapping information to the user. The EVC server 404 further comprises of a mapping database 410 stored in the XDM server for synchronizing visual content along with the traditional audio IVR based on the input provided by the user. The user input is provided using DTMF, voice or text processed from voice. The EVC server 404 is also adapted for forwarding request for example a current web URL, to the mapping database 410 for mapping input provided by the user with information stored in the mapping database 410. The mapping database 410 may consist of one or more elements for providing mapping information to the user. The one or more elements comprise of a currentwebURL, a nextwebURL, a DTMF code and text processed from speech. Based on currentwebURL and the user input, the mapping database 410 retrieves the nextweburl and forwards to the EVC client device 406. Simultaneously, the EVC client device 406 communicates with the content server 408 to retrieve the visual content relating to the nextweburl. In one embodiment, the content server 408 may be collocated with the EVC server 404 and hence the visual content can be directly retrieved from the EVC server itself.

In one embodiment, enriched information including URL, content etc to be shared are first composed in XML format and then shared to a client device via SIP protocol e.g., MSRP or SIP MESSAGE or SIP INFO. An example of structure for Enriched Information is as below:

```
<?xml version="1.0" encoding="UTF-8"?>
<evcenrichedinfo
xmlns="urn:gsma:params:xml:ns:oma:evc:enrichedinfo">
    <call_correlation_info>
        <from>[MSISDN or SIP URI]</from>
        <to>[MSISDN or SIP URI]</to>
    </call_correlation_info>
    <evc_data>
        <link>[HTTP URL]</link>
    </evc_data>
</evcenrichedinfo>
```

Note that not all elements under <evcenrichedinfo> are mandatory and it is possible to extend by adding new elements. Elements under <call_correlation_info> are included to associate the enriched information with the call that is being setup. It is possible to extend with more elements that will help the client identify the call uniquely.

Elements under <evc_data> contains the link to the enriched information that the client is going to associate with a call. The structure of the elements under <evc_data> can be defined according to the need of the use case e.g., unique identifier/Reference ID to the content. If the enriched information is other than web page, then the elements corresponding to the stored file is included. The <evc_data> element may contain a link to the enriched information that may be stored in the network or the actual data that is embedded inline. That is, the XML schema of the <evc_data> element can either contain the HTTP URL of the enriched information that is being stored in the network and shared to the other EVC user, represented as MIME Content-Type: "application/xml" (or) the <evc_data> element can contain actual data of the enriched information in "multipart" MIME message, represented as Content-Type: multipart/mixed; boundary="boundaryXX". The actual file data can be sent as MSRP message under the Content-Type: "application/[file-type]", where [file-type] can be image, video etc and file related information can be sent as XML information as another multipart with the boundary XX. In either case, the receiving client is expected to consume the enriched information that is available under the <evc_data> element and present it to the user either during pre-call, mid-call or post-call. The client retrieves the web page or the file from the link/URL or unique identifier/Reference ID provided, before displaying to the user with the associated call.

Figure 5:
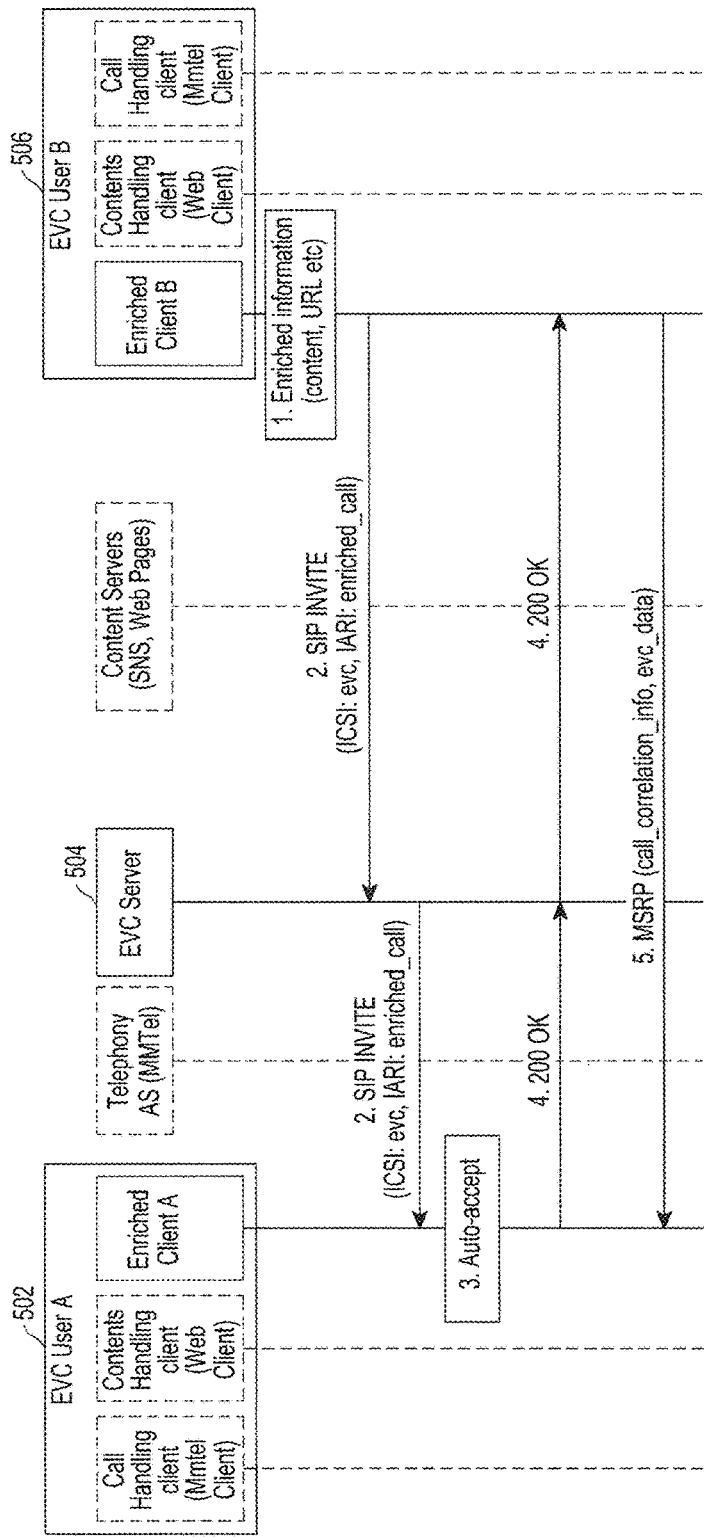
FIG. 5 is a flow diagram illustrating an exemplary method of sharing enriched information between an EVC user A and EVC user B using message session relay protocol (MSRP), according to one embodiment.

FIG. 5 is a flow diagram illustrating an exemplary method of sharing enriched information between an EVC user A and EVC user B using message session relay protocol (MSRP), according to one embodiment. At first, an enriched client B associated with the EVC user B 502 gathers enriched information comprising content, URL etc. for composing <call_correlation_info> and <evc_data>. The enriched client B associated with the EVC user B 502 initiates a SIP invite message containing EVC service related ICSI and IARI before sending the SIP INVITE to Enriched Client A associated with the EVC user A 506, with whom the enriched information is being shared. The SIP INVITE establishes a SIP session with MSRP channel to transmit the enriched information over it and forwards the request towards an EVC server 504. The EVC server 504 then forwards the SIP invite message to enriched client A of EVC user A 502. The EVC client A sends an autoaccept response message to the EVC server 504 for sharing the enriched information and a MSRP channel is established. The MSRP channel is used to transmit the XML payload containing the enriched information. The EVC server 504 forwards the response message to enriched client B for sharing the enriched information.

Figure 6:
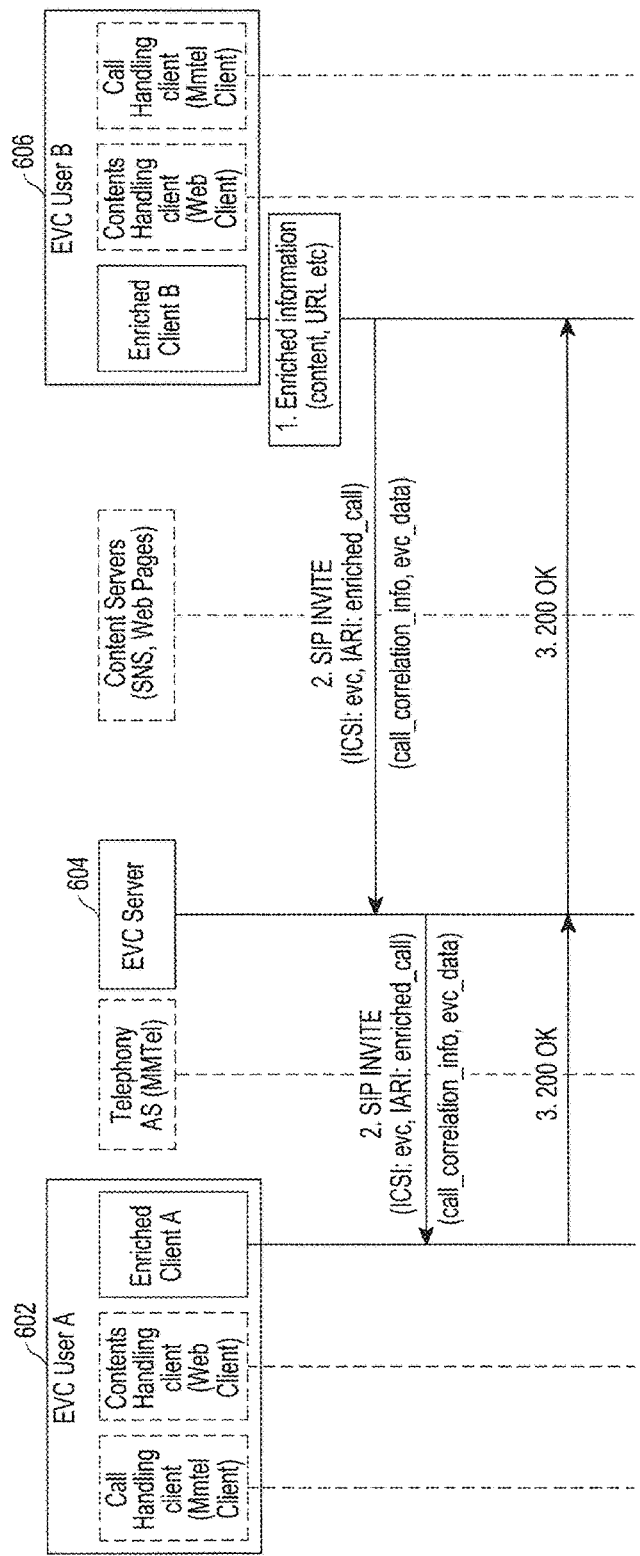
FIG. 6 is a flow diagram illustrating an exemplary method of sharing enriched information between an EVC user A and EVC user B using session initiation protocol message (SIP MESSAGE), according to one embodiment.

FIG. 6 is a flow diagram illustrating an exemplary method of sharing enriched information between an EVC user A and EVC user B using Session initiation protocol message (SIP) MESSAGE, according to one embodiment. At first, an enriched client B running in the EVC user device B 604 gathers enriched information comprising content, URL etc. for composing <call_correlation_info> and <evc_data>. The enriched client B running in the EVC user device B 606 composes a SIP message containing EVC service related ICSI and IARI before sending the SIP message to Enriched Client A running in the EVC user device A 602, with whom the enriched information is being shared. The SIP message initiates a SIP session to transmit the enriched information over it and forwards the request towards an EVC server 604. The EVC server 604 then forwards the SIP message to enriched client A of EVC user device A 602. The EVC client A of the EVC user device A 602 sends a 200 OK response for the receipt of the SIP message towards the EVC server 604. The EVC server 604 then forwards the response message to enriched client B for sharing the enriched information.

Figure 7:
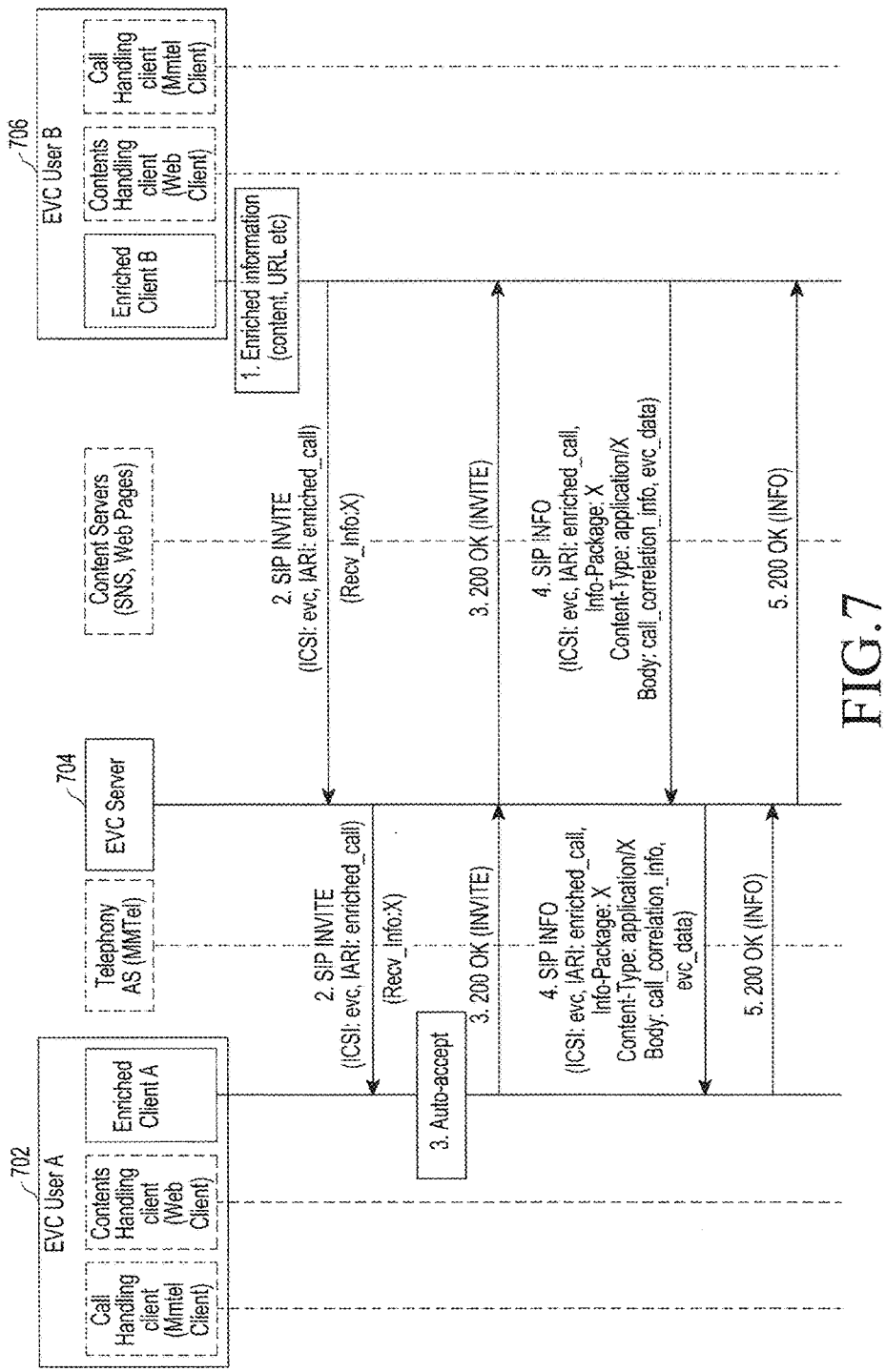
FIG. 7 is a flow diagram illustrating an exemplary method of sharing enriched information using SIP INFO, according to one embodiment.

FIG. 7 is a flow diagram illustrating an exemplary method of sharing enriched information using SIP INFO, according to one embodiment. As shown in FIG. 7, an Enriched Client B running in an EVC user device B 706 gathers required data (content, URL etc) for composing <call_correlation_info> and <evc_data>. The Enriched Client B running in the EVC user device B 706 sends SIP INVITE request including EVC service related ICSI and IARI via an EVC server 704 to an Enriched Client A running in EVC user device A 702, with whom the enriched information is being shared. The SIP INVITE message also includes "Recv_Info" header with the name of Info-Package e.g., g.oma.evc.enriched_info which is to be transmitted via SIP INFO to transmit the enriched information. In response to the SIP INVITE request message the Enriched Client A running in EVC user device A 702, automatically accepts the SIP INVITE and sends 200 OK responses back for the SIP INVITE request message to the EVC server 704 and the EVC server 704 then forwards the same to EVC user device B 706. The Enriched Client B running in the EVC user device B 706 then transmits a SIP INFO message including the payload for the Info-Package (e.g., g.oma.evc.enriched_info) containing <call_correlation_info> and <evc_data> via the EVC server 704 to the EVC user device A 702. The Enriched Client A running in the EVC user device 702, after receiving the SIP INFO message sends 200 OK response for the SIP INFO request for sharing the enriched information.

Figure 8A:
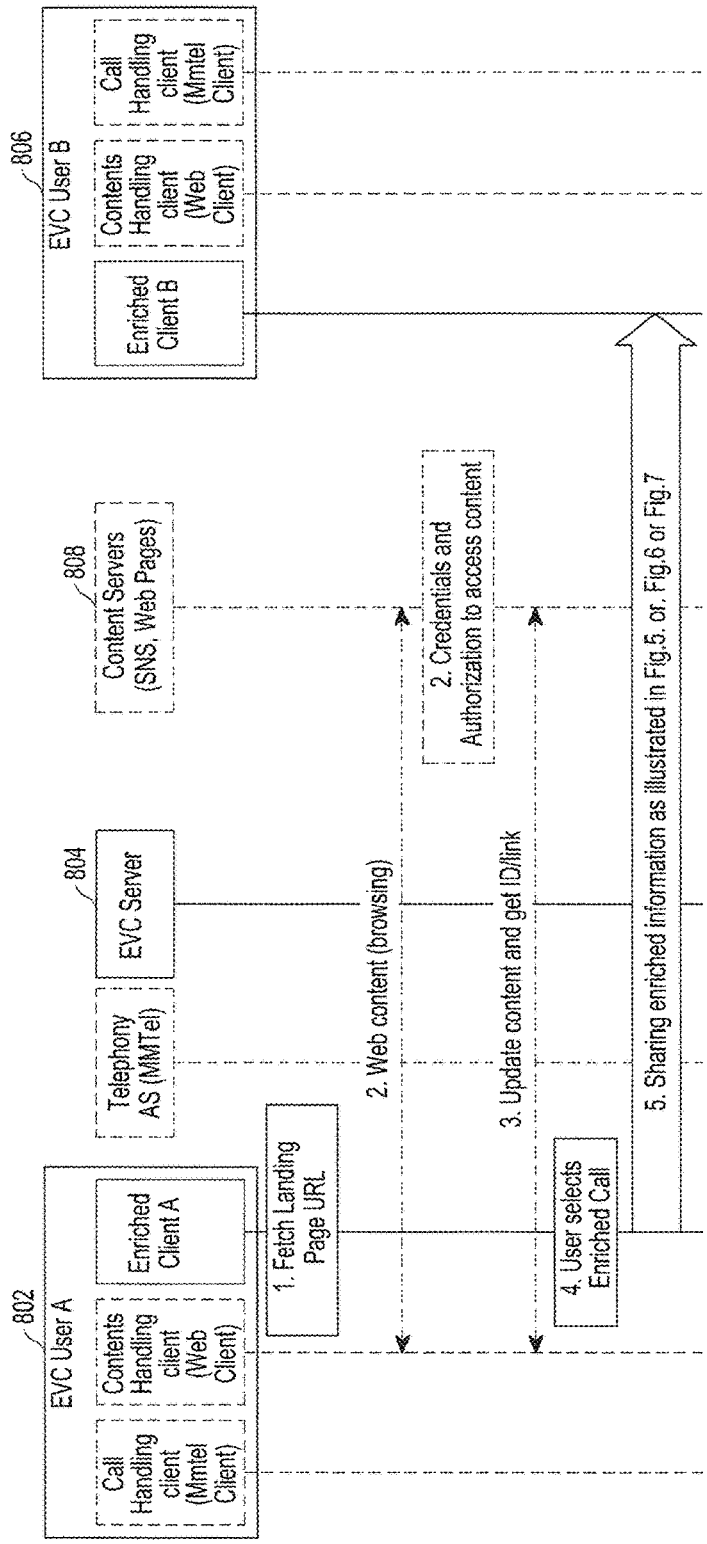
FIGS. 8A and 8B is a flow diagram illustrating an exemplary Web+Call scenario for navigating through business content on the web and placing a call and sharing information corresponding to the call, according to one embodiment.
Figure 8B:
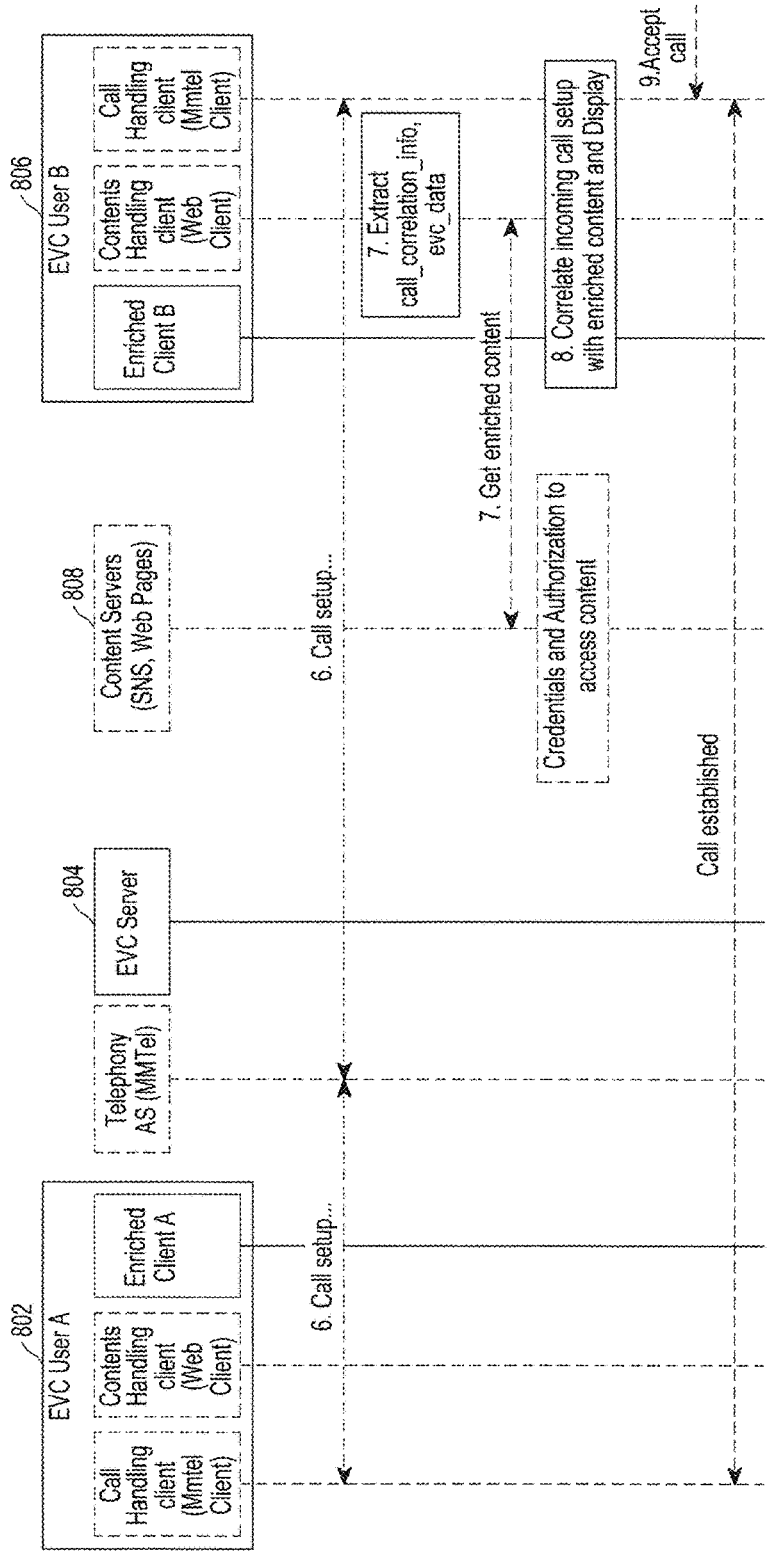

FIG. 8a,b is a flow diagram illustrating an exemplary Web+Call scenario for navigating through business content on the web and placing a call and sharing information corresponding to the call, according to one embodiment. An exemplary web+call scenario is explained in FIG. 1. In order to provide both business content and call to a business entity, the procedural steps are explained wherein an Enriched Client A of an EVC user A 802 fetches a landing page URL associated with an EVC user B 806. Upon obtaining the landing page, the EVC User A 802 browses web content associated with the landing page URL after proper authentication and authorization. Based on interaction by the EVC User A 802 with the web content (e.g. filling a web form, placing an order), the EVC Client A posts content on an EVC Server 804, and obtains a reference to it. The reference may be a URL to the posted content or a unique identifier/Reference ID to the content. The EVC User A 802 makes an Enriched Call e.g. using a link provided within the web content, directly via a native call button on the device for sharing enriched information. The EVC Client A shares the enriched information (e.g. URL, Reference IDs, etc.) with EVC Client B and a Call Setup is initiated between the EVC user A 802 and EVC user B 806. The EVC Client B extracts the <call_correlation_info> and <evc_data> from the enriched information shared by EVC User/Client A. Further, a content handling client at EVC User B fetches the enriched content after proper authentication and authorization. Thereafter, the enriched Content and incoming call setup are correlated and presented to EVC User B 806. The EVC Client B may forward the enriched information display report to EVC Client A. and the EVC User B 806 answers and the call is established.

Figure 9:
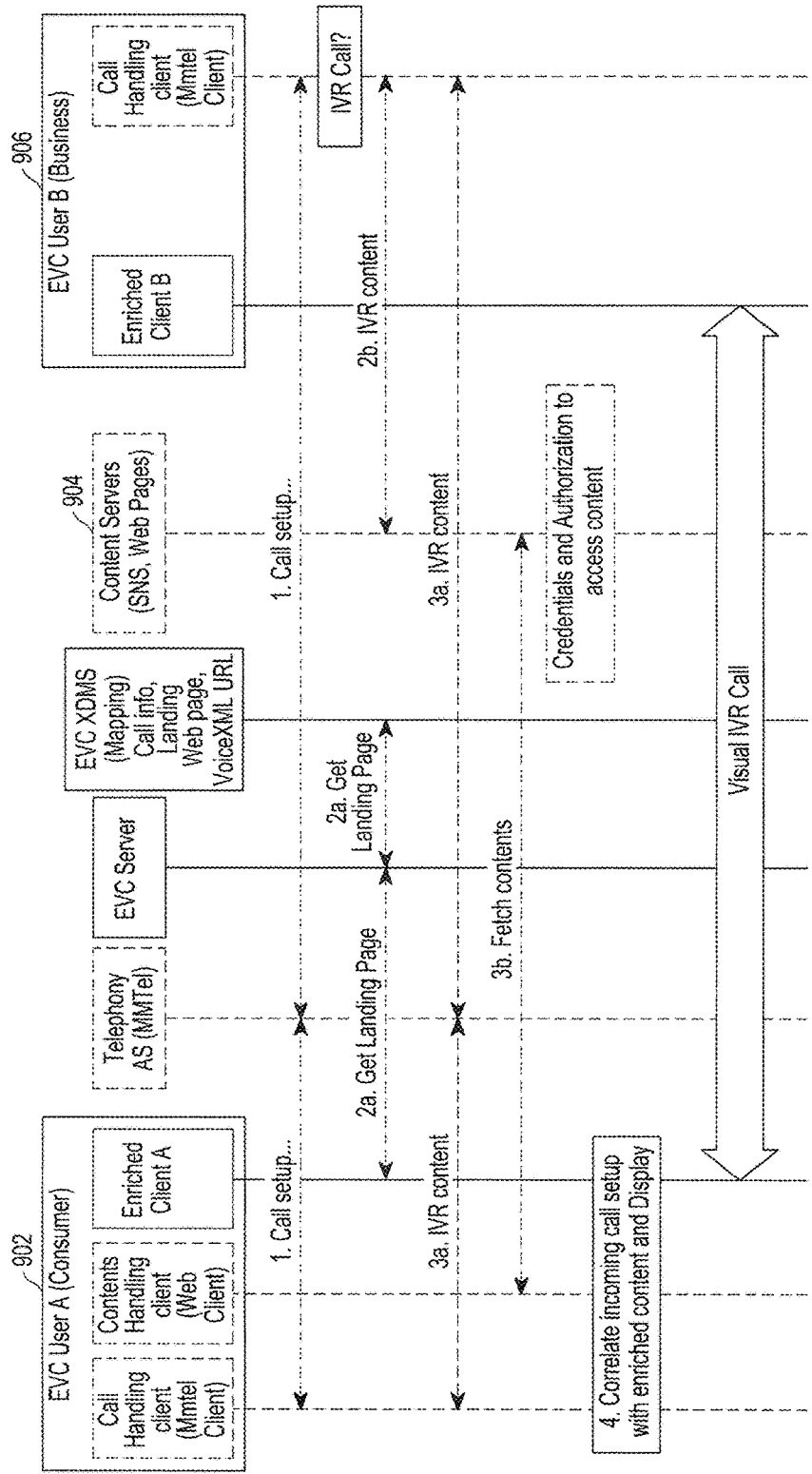
FIG. 9 is a flow diagram illustrating an exemplary method of providing visual interactive voice response (VIVR) for obtaining a landing page, according to one embodiment.

FIG. 9 is a flow diagram illustrating an exemplary method of providing visual interactive voice response (VIVR) for obtaining a landing page, according to one embodiment. In this embodiment, a method for mapping and fetching the landing page of a visual IVR system is described. Also, the type of IVR System is inquired along with the mapping of the landing page. Consider that a call setup is ongoing between the EVC User A 902 (Consumer) and EVC User B 906 (Business) and the call setup terminates on an IVR system. The EVC Client at User A 902 obtains the landing page URL and information about the type of traditional IVR system (DTMF Only, Voice Only or Hybrid). Further, a content handling client at EVC Client A fetches visual content for example a Landing Web Page) corresponding to the Landing Page URL, from a content server 904 after proper authentication and authorization. Since it is an IVR call, a Call handling client of EVC User B 906 fetches IVR Content from an IVR Server and forwards IVR Content (audio) to Call handling client of EVC User A 902. Then the visual content and IVR contents are correlated and presented to the EVC user A 902.

Figure 10:
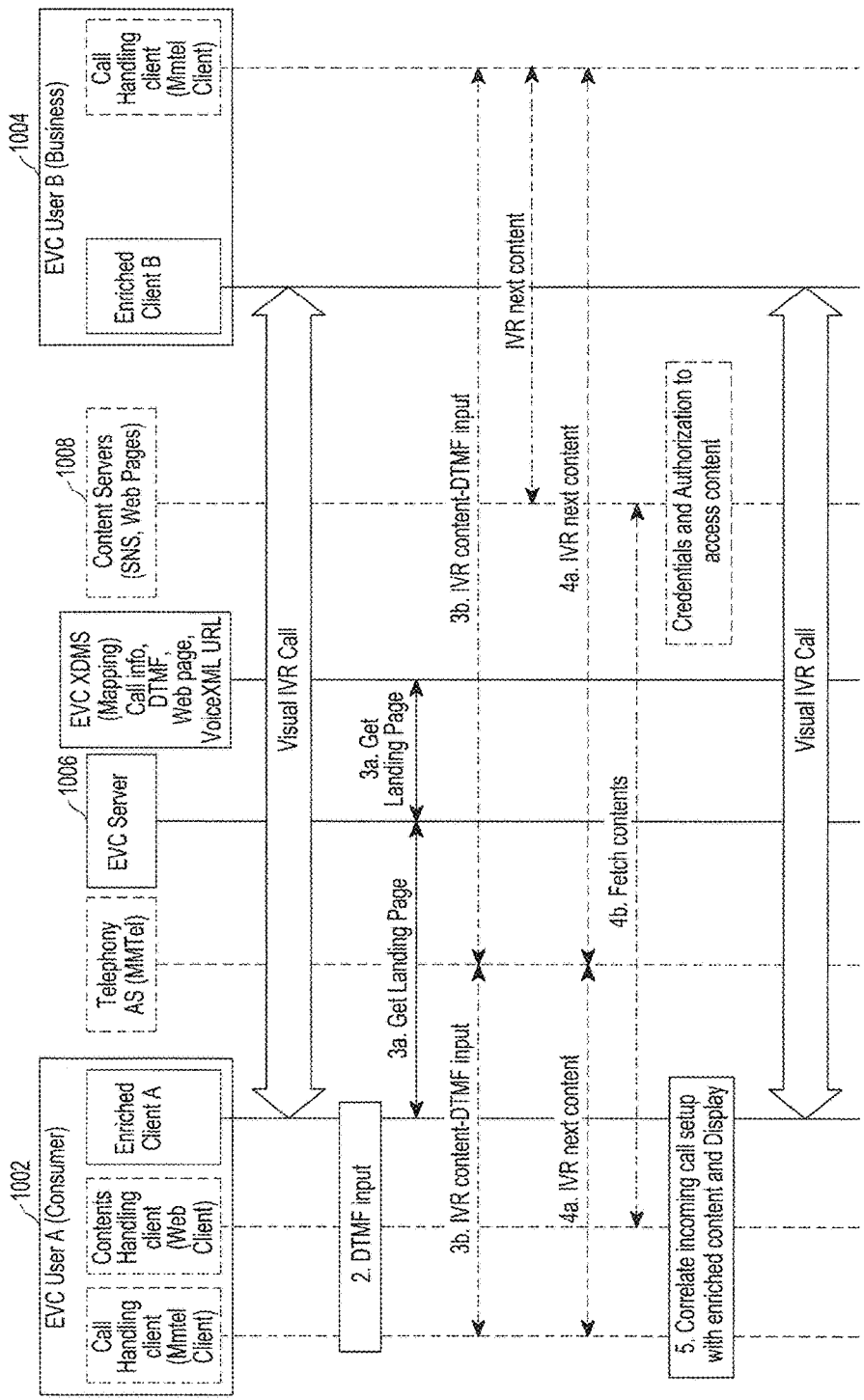
FIG. 10 is a flow diagram illustrating an exemplary method for performing navigation on visual IVR using DTMF as user input, according to one embodiment.

FIG. 10 is a flow diagram illustrating an exemplary method for performing navigation on visual IVR using DTMF as user input, according to one embodiment. As shown in FIG. 10, consider that a Visual IVR Call is ongoing between EVC User A 1002 (Consumer) and EVC User B 1004 (Business). The visual IVR content associated with a current web URL, for example a landing web page is provided to the EVC user A 1002 along with a traditional IVR call. The EVC user A 1002 inputs a DTMF code on the current web URL in order to obtain a next page URL. Based on the DTMF code, the EVC Client at User A gets the Next Page URL from an EVC Server 1006. A content handling client at EVC Client A fetches the visual content corresponding to the Next Page URL, from the content server 1008 after proper authentication and authorization. Also, the DTMF code provided by the user is forwarded to the call handling client at EVC User B 1004 by the call handling client at EVC User A 1002, so that the Call Handling Client at EVC User B 1004 fetches and responds with the corresponding IVR Content to Call Handling Client at EVC User A 1002. Then, the Visual Content and IVR Content are correlated and presented to the EVC user A 1002.

Figure 11:
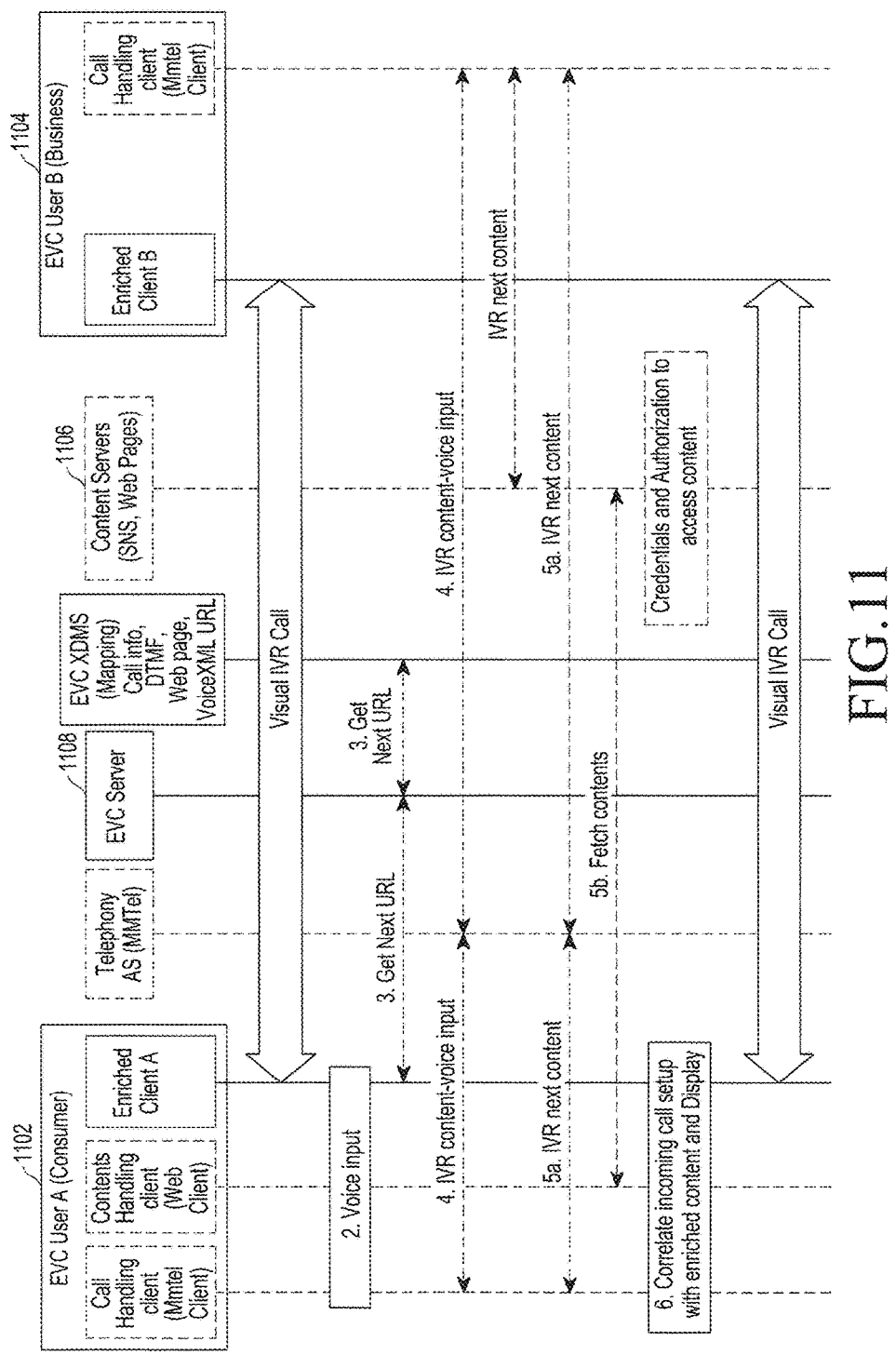
FIG. 11 is a flow diagram illustrating an exemplary method for performing navigation on visual IVR using voice input, according to one embodiment.

FIG. 11 is a flow diagram illustrating an exemplary method for performing navigation on visual IVR using voice input, according to one embodiment. As shown in FIG. 11, consider that a Visual IVR Call is ongoing between EVC User A (Consumer) 1102 and EVC User B (a Business entity) 1104. The visual IVR content associated with a current web URL, for example a landing web page is provided to the EVC user A 1102 along with a traditional IVR call. The EVC user A 1102 may provide a voice input. Based on the voice input, the EVC Client at User A 1102 gets the Next Page URL from an EVC server 1108. Simultaneously, a content handling client at EVC Client A fetches the Visual IVR Content corresponding to the Next Page URL from a content server 1106 after proper authentication and authorization. Additionally, a call handling client at EVC User A 1102 forwards the Voice Input to call handling client at EVC User B 1104 via the EVC server 1108. The call handling client at EVC User B 1104 upon receiving the voice input fetches and responds with a corresponding audio IVR content to call handling client at EVC User A 1102. Thus, both the visual IVR content and the corresponding audio IVR content associated with next page URL are correlated and presented to the EVC user A 1102.

Figure 12:
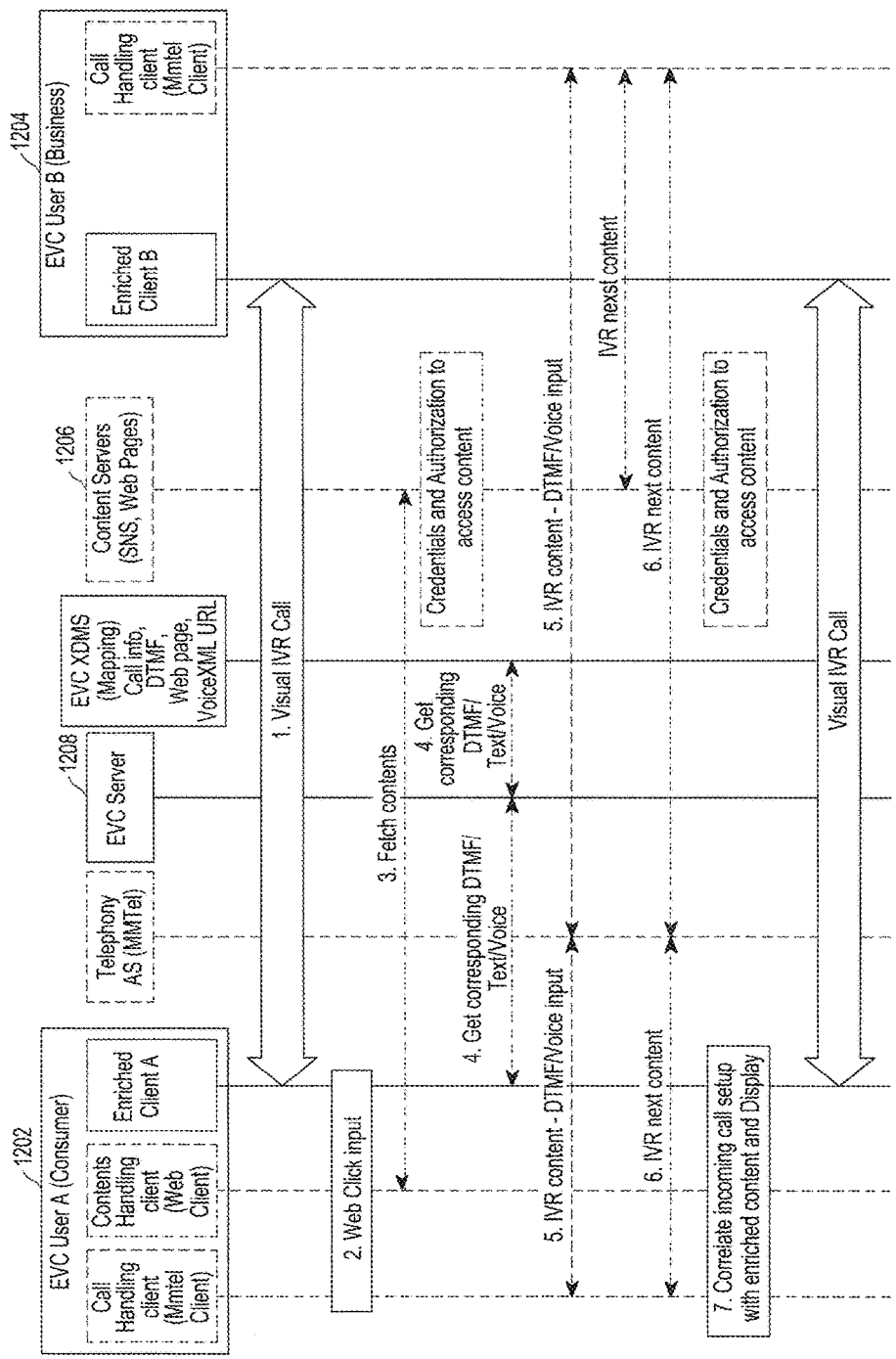
FIG. 12 is a flow diagram illustrating an exemplary method for performing navigation on visual IVR using web click input, according to one embodiment.

FIG. 12 is a flow diagram illustrating an exemplary method for performing navigation on visual IVR using web click input, according to one embodiment. In this embodiment, consider that a Visual IVR Call is ongoing between EVC User A 1202 (Consumer) and EVC User B 1204 (a Business entity). The visual IVR content associated with a current web URL, for example a landing web page is provided to the EVC user A 1202 along with a traditional IVR call. The EVC user A 1202 clicks on the visual IVR content, it is interpreted as a web-click, which is associated to a URL. Based on the URL, EVC Client A 1202 fetches visual content from a content server 1206 after proper authentication and authorization. The EVC Client at User A 1202 gets the corresponding DTMF/Text/Voice from the network e.g. an EVC Server 1208. A Call Handling Client at EVC Client A forwards DTMF/Voice as input to Call Handling Client at EVC User B 1204. The Call Handling Client at EVC User B 1204 fetches an audio IVR Content corresponding to the input from the Call Handling Client at EVC User A 1202, and the associated Call Handling Client at EVC User B 1204 responds with the IVR Content to Call Handling Client at EVC User A 1202. Then, both the visual IVR content and audio IVR Content associated with the next page are correlated and presented to the EVC user A 1202.

FIG. 13 illustrates an exemplary mapping table stored in an EVC XDM Server for providing visual IVR content to an EVC client device, according to one embodiment. The mapping table acts as a reference table and it is used for synchronizing the Visual Content and a corresponding audio IVR Content which are on different servers and are transported via different channels for mapping visual IVR with a corresponding audio IVR. As shown in FIG. 13, the mapping table comprises of one or more attributes namely a Current Web URL, a Next Web URL, a DTMF Code and a Text processed from Speech. For example consider that the mapping table receives a current web URL and an input (either DTMF input or speech input) provided by a user from the EVC server. In one embodiment, the EVC user can provide current web URL using at least one of a DTMF tone, a voice tone and a web click action. The mapping table correlates the received current web URL and the input with the information which is already pre-stored in the mapping table and provides an output i.e, the next web URL to the EVC server. The EVC server then provides the visual IVR content URL associated with the next web URL to the EVC client device. Further, a content server provides the related visual IVR content to the EVC client device. Thus, when current URL is known either receiving a DTMF input or Speech input from the user, the mapping table retrieves the Next web URL. In case of web click input, the mapping table requires the current URL and next URL, and DTMF or speech input to provide visual IVR content associated with the next web URL.

An exemplary XML structure for the mapping table is described as below.

```
<?xml version="1.0"?>
<evc-mapping-table>
    <MSISDN id=12345>
        <CurrentWebURL URL="">
            <mapping>
                <NextWebURL>../Index.html</NextWebURL>
            </mapping>
        </CurrentWebURL>
        <CurrentWebURL URL="../Index.html">
            <mapping>
                <DTMFCode>1</DTMFCode>
                <Text>New Order</Text>
                <NextWebURL>../NewOrder.html</NextWebURL>
            </mapping>
            <mapping>
                <DTMFCode>2</DTMFCode>
                <Text>Track Order</Text>
                <NextWebURL>../TrackOrder.html</NextWebURL>
            </mapping>
            <mapping>
                <DTMFCode>3</DTMFCode>
                <Text>Offers</Text>
                <NextWebURL>../Offers.html</NextWebURL>
            </mapping>
            <mapping>
                <DTMFCode>4</DTMFCode>
                <Text>Feedback</Text>
                <NextWebURL>../Feedback.html</NextWebURL>
            </mapping>
            <mapping>
                <DTMFCode>0</DTMFCode>
                <Text>Customer Care</Text>
                <NextWebURL>../Support</NextWebURL>
            </mapping>
        </CurrentWebURL>
        <CurrentWebURL URL="../NewOrder.html">
            <mapping>
                <DTMFCode>1</DTMFCode>
                <Text>Pizza</Text>
                <NextWebURL>../NewOrder_Pizza.html
            </NextWebURL>
            </mapping>
            <mapping>
                <DTMFCode>2</DTMFCode>
                <Text>Breads</Text>
                <NextWebURL>../NewOrder_Breads.html
            </NextWebURL>
            </mapping>
            <mapping>
                <NextWebURL>...</NextWebURL>
                <DTMFCode>...</DTMFCode>
                <Text>...</Text>
            </mapping>
        </CurrentWebURL>
    </MSISDN>
    <MSISDN id=56789>
        .   .   .
        .   .   .
        .   .   .
</Map>
```

This structure is not exhaustive and more information can be included.

FIG. 14 is a tabular diagram illustrating exemplary types of inputs supported by a traditional IVR system, according to one embodiment. The traditional IVRs can be of three types depending on the types of input they can handle as DTMF Only, Voice Only, and Hybrid. As shown in FIG. 14, the table maintains IVR type information for each user registered to the EVC XDMS. The table stores the contact number and corresponding IVR input type supported by the IVR system.

An exemplary XML schema for FIG. 14 is described as below:

```
<?xml version="1.0"?>
<TypeOfIVR>
    <record>
        <MSISDN>18001236789</MSISDN>
        <Type>DTMF Only</Type>
    </record>
    <record>
        <MSISDN>08085479568</MSISDN>
        <Type>Voice Only</Type>
    </record>
    <record>
        <MSISDN>18002581800</MSISDN>
        <Type>Hybrid</Type>
    </record>
    <record>
        <MSISDN>18007156947</MSISDN>
        <Type>Hybrid</Type>
    </record>
    .   .   .
    .   .   .
</TypeOfIVR>
```

Figure 15A:
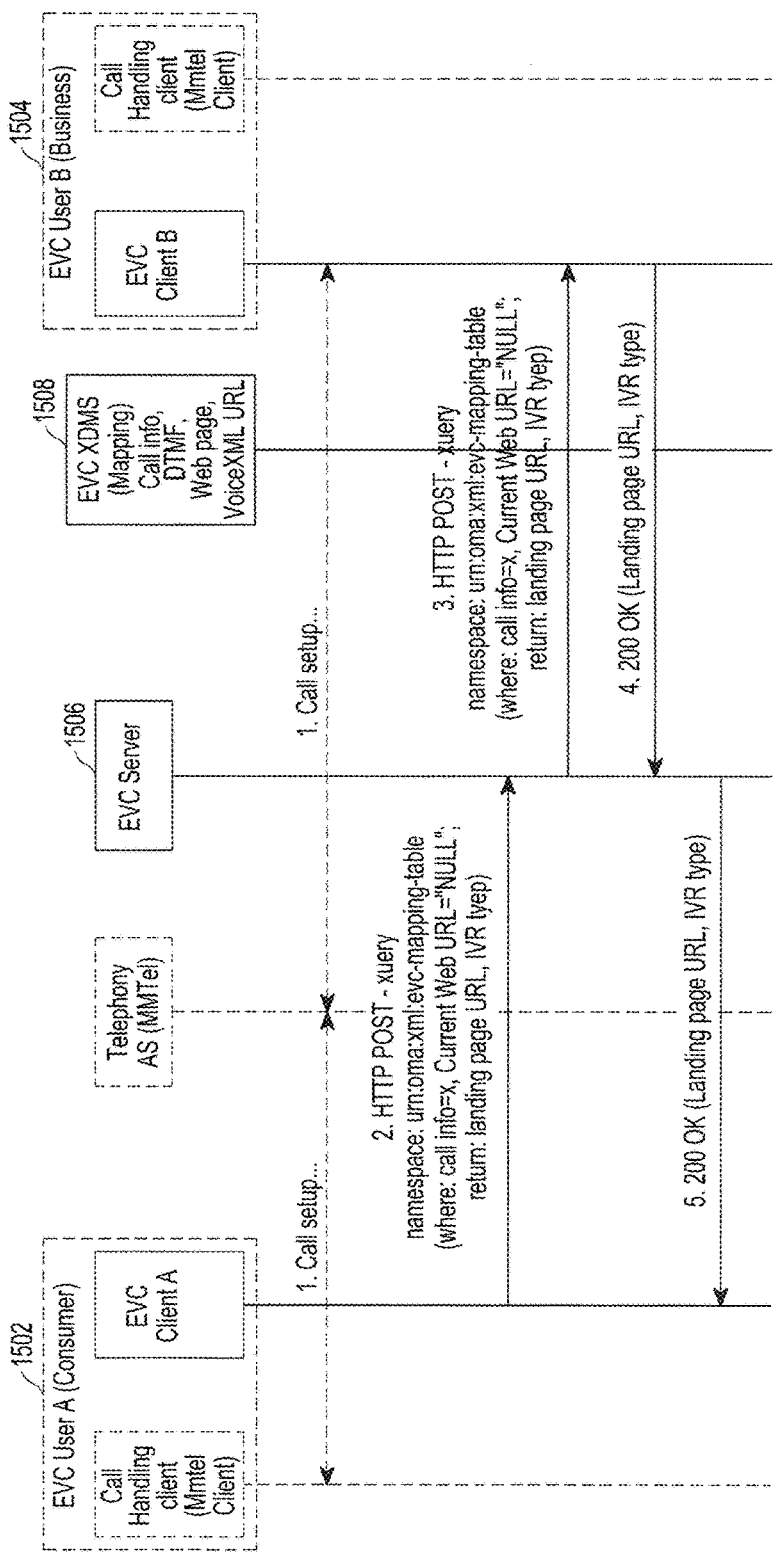
FIG. 15A is a flow diagram illustrating an exemplary reception of visual IVR content associated with a landing page URL from an EVC XDM server, according to one embodiment.
Figure 15B:
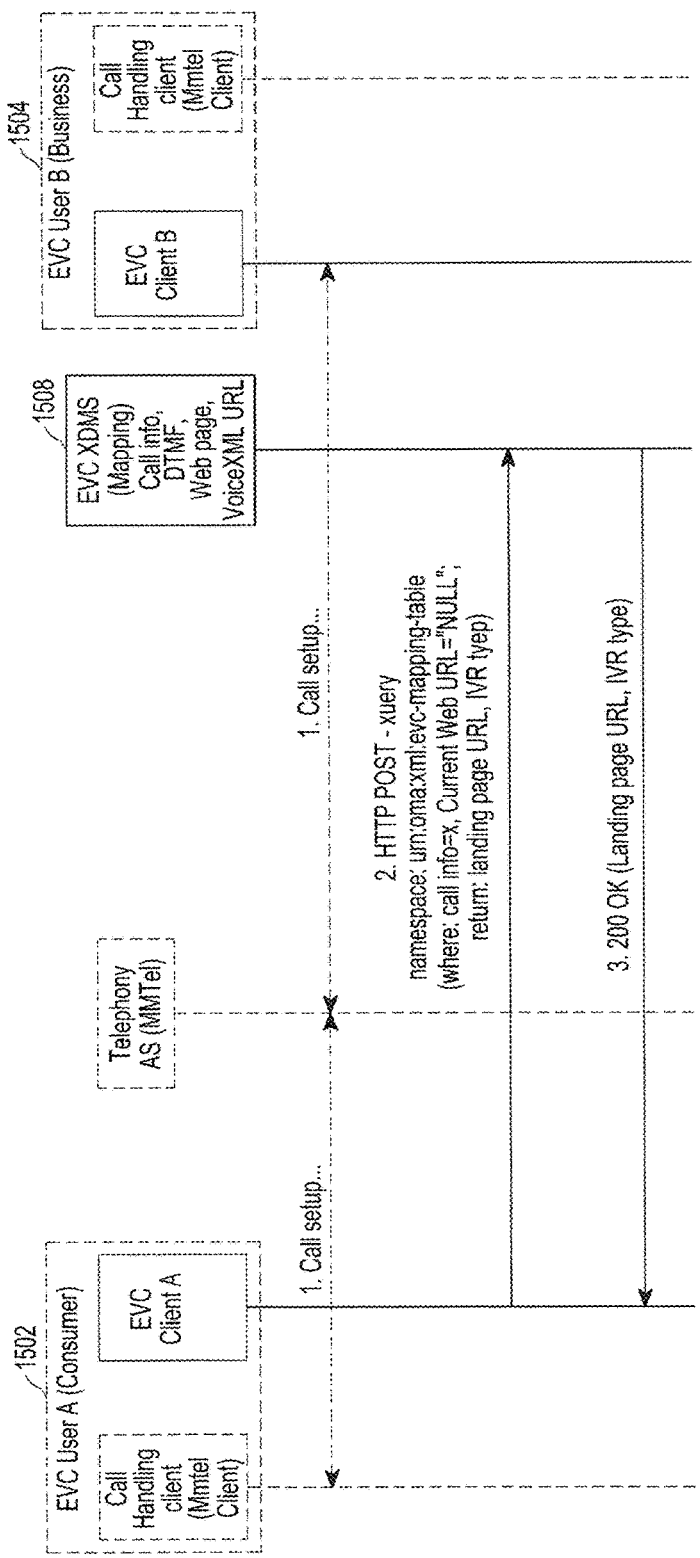
FIG. 15B is a flow diagram illustrating an exemplary reception of visual IVR content associated with a landing page URL from an EVC XDM server, according to another embodiment.

FIG. 15A is a flow diagram illustrating an exemplary reception of landing page URL associated with visual IVR content from an EVC XDM server, according to one embodiment. As shown in FIG. 15A, consider that an EVC user A 1502 initiates a visual interactive voice response (IVR) call to EVC user B 1504. In this embodiment, the EVC user A 1502 is a consumer and the EVC user B 1504 is a business entity. At step one a call is established between the EVC user A 1502 and EVC user B 1504. Then at step two, the EVC client A of the EVC user A 1502 sends a HTTP POST xquery search request towards an EVC Server 1506. The search is targeted to return the landing page URL and IVR type from EVC XDMS 1508. The search request includes call info and Current Web URL as 'NULL'. The EVC server 1506 at step three, forwards the request to the EVC XDMS 1508. In turn, the EVC XDMS 1508 uses a mapping table stored in the EVC XDMS 1508 to retrieve corresponding landing page URL and IVR type and transmits a response along with the landing page URL and IVR type to the EVC server 1506 at step four. Then EVC server 1506 at step five forwards the landing page URL to the EVC user A 1502. In another embodiment, after establishing the call between EVC user A 1502 and EVC user B 1504, the EVC client of the user A 1502 directly sends the search request including current web URL to the EVC XDM server 1508. The EVC XDMS 1508 in turn retrieves the landing page URL and IVR type relating to the visual IVR content and forwards to EVC user A 1502. The same is illustrated in FIG. 15*b*.

Figure 15C:
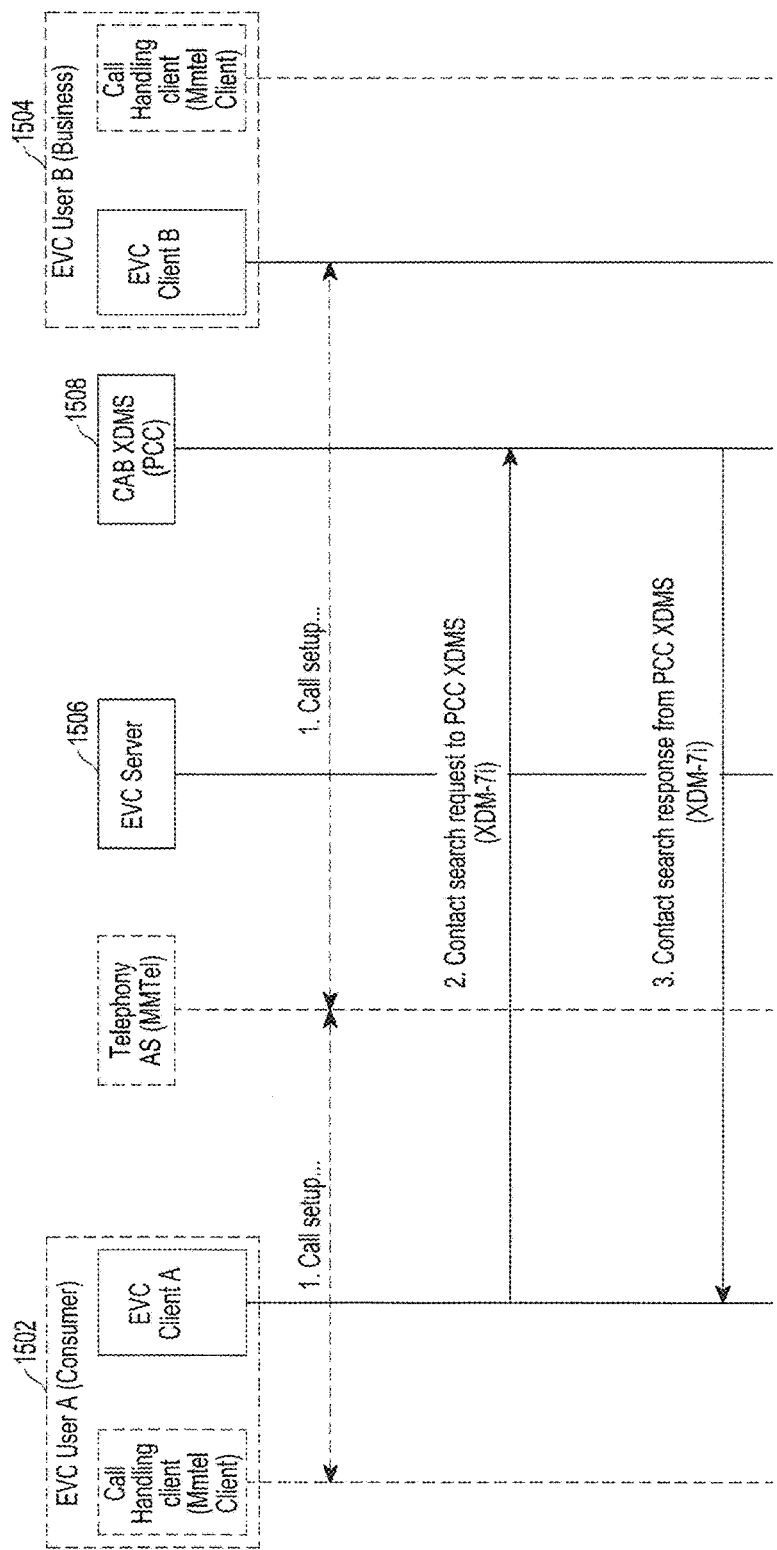
FIG. 15C is a flow diagram illustrating an exemplary reception of visual IVR content associated with a landing page URL from an EVC XDM server, according to yet another embodiment.
Figure 15D:
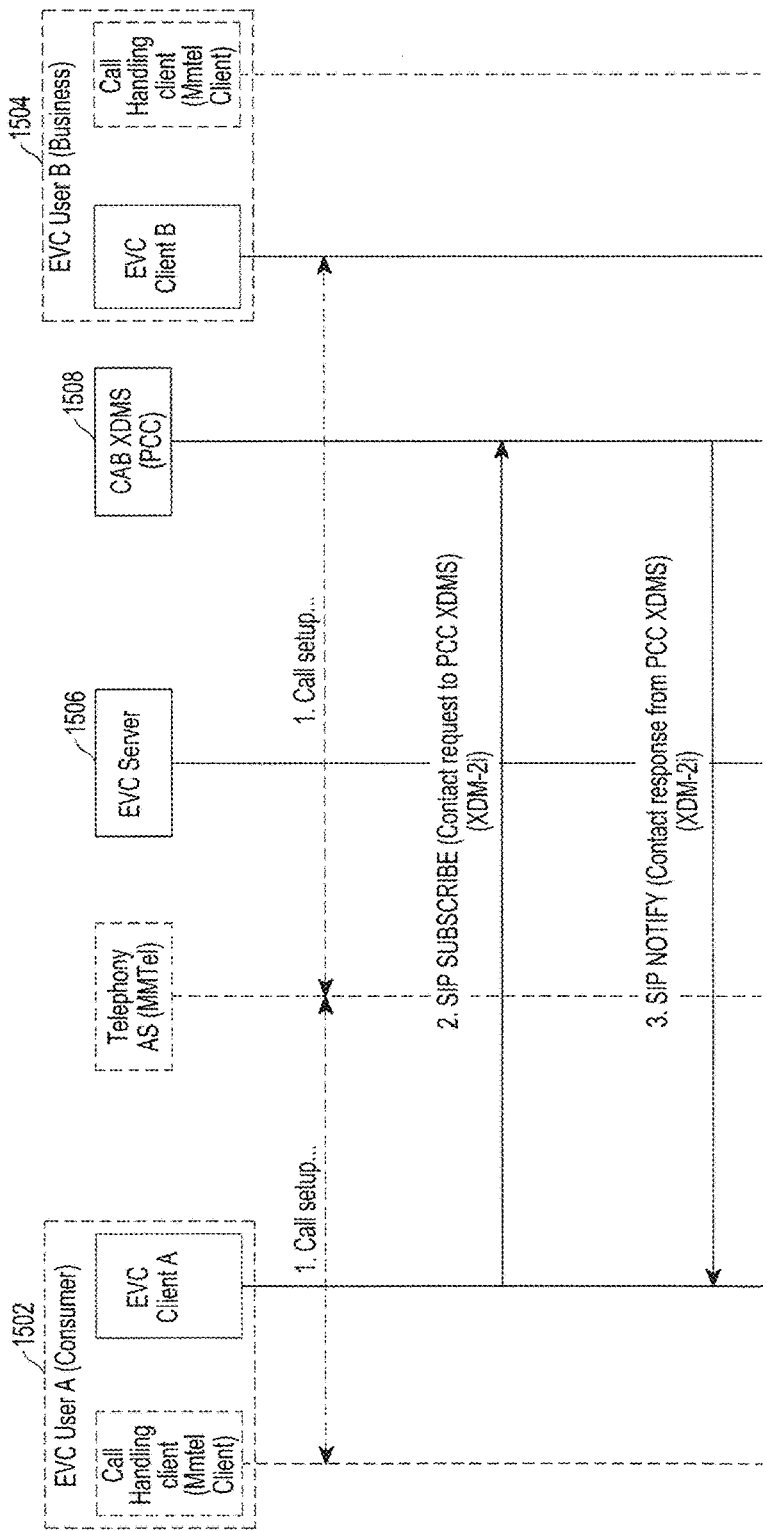
FIG. 15D is a flow diagram illustrating an exemplary reception of visual IVR content associated with a landing page URL from an EVC XDM server, according to further embodiment.

In an alternate embodiment, the EVC user A 1502 can obtain landing page URL associated with visual IVR content from a CAB XDM server as shown in FIG. 15C. As shown in FIG. 15C, upon establishing a call with EVC user B 1504, the EVC user A 1502 transmits a contact search request to PCC XDMS 1510. The request is based on XDM-7i. Upon receiving the contact search request, the CAB XDMS (PCC) 1510 forwards the EVC Client A's contacts card information towards the EVC Client A in contact search response (XDM-7i). The landing page of EVC user B 1504 is stored in the <web-resources> element under the <org-details> element. And a new element <IVR-Type> is included under the <org-details> and IVR type is stored in it. In another embodiment, the EVC user A 1502 transmits a SIP SUBSCRIBE contact search request towards the CAB XDMS (PCC) 1510. This request is based on XDM-2i. Upon receiving the contact search request, the CAB XDMS (PCC) 1510 forwards the EVC Client A's contacts card information towards the EVC Client A in contact search response (XDM-7i). The same is illustrated in FIG. 15*d*.

Figure 16A:
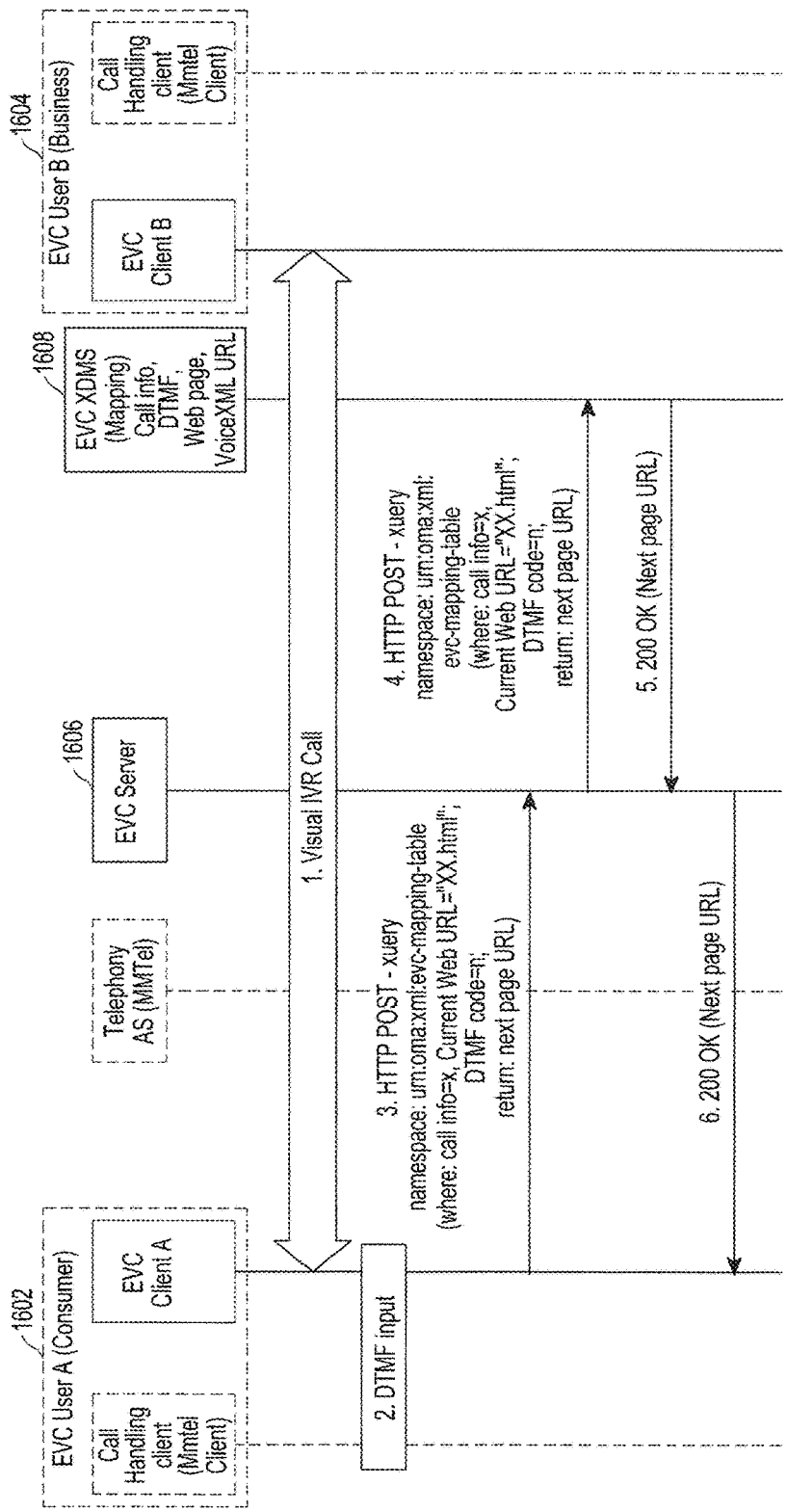
FIG. 16A is a flow diagram illustrating an exemplary method for receiving a subsequent webpage URL using a dual tone multi frequency input provided by an EVC user A, according to one embodiment.

FIG. 16A is a flow diagram illustrating an exemplary method for receiving a subsequent webpage URL using a dual tone multi frequency input provided by an EVC user A, according to one embodiment. As shown in FIG. 16*a*, consider that an EVC user A 1602 initiates a visual interactive voice response call (IVR) call to EVC user B 1604 at step one, where the EVC user A 1602 is a consumer and the EVC user B 1604 is a business entity. Upon establishing the visual IVR call, the visual IVR content associated with visual IVR call is presented to the EVC user A 1602. The EVC user A 1602 may provide a DTMF code as input on the visual IVR content provided to the EVC user A 1602 at step two. At step 3, an EVC client A of the EVC user A 1602 transmits a HTTP POST xquery search request to an EVC Server 1606. The search is targeted to return a subsequent page URL from EVC XDMS 1608. The search request includes call info, current Web URL and user input, the DTMF code. The EVC server 1606 at step four forwards the request to an EVC XDMS 1608. In turn, the EVC XDMS 1608 uses a mapping table stored in the EVC XDMS to retrieve corresponding subsequent page URL and transmits a response along with the subsequent page URL to the EVC server 1606 at step five. Then EVC server 1606 at step six forwards the subsequent page URL to the EVC user A 1602. Then from a content server (not shown in FIG. 16*a*), the visual IVR content relating to the subsequent page URL is retrieved and presented to the EVC user A 1602. In one embodiment, the content relating to the subsequent page URL can be presented to the EVC user A by the EVC server itself. The same is illustrated in FIG. 16*a*.

Figure 16B:
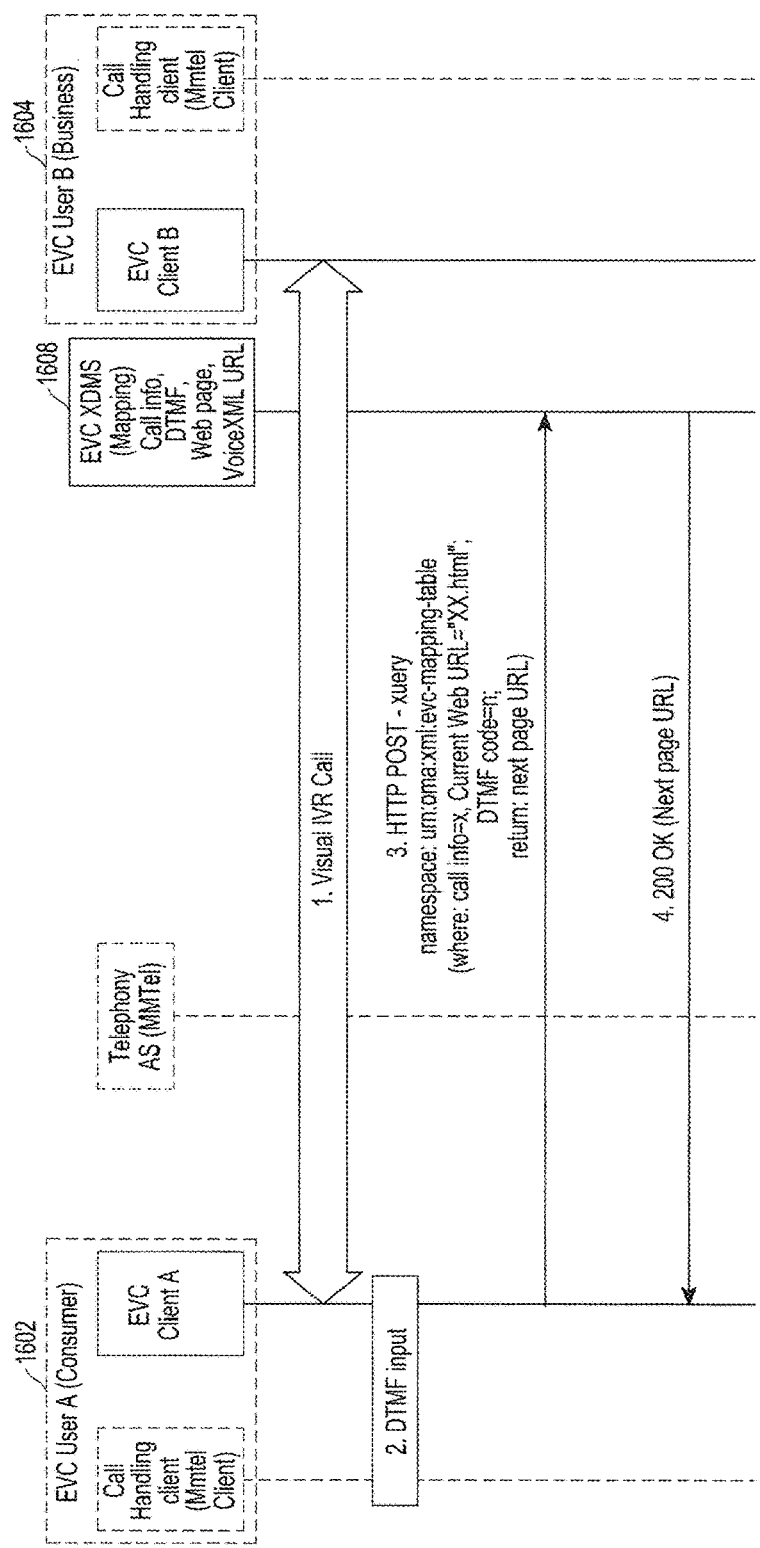
FIG. 16B is a flow diagram illustrating an exemplary method for receiving a subsequent webpage URL using a dual tone multi frequency input provided by an EVC user A, according to another embodiment.

In an alternate embodiment, the EVC client of the user A may directly transmits the search request including current web URL and the DTMF code input provided by the EVC user A to the EVC XDM server 1608. The EVC XDM Server 1608 in turn uses the mapping table and retrieves the subsequent page URL relating to the visual IVR content based on the DTMF code provided by the user and forwards the subsequent page URL relating to visual IVR content to the EVC user A 1602. The same is illustrated in FIG. 16B.

Figure 17A:
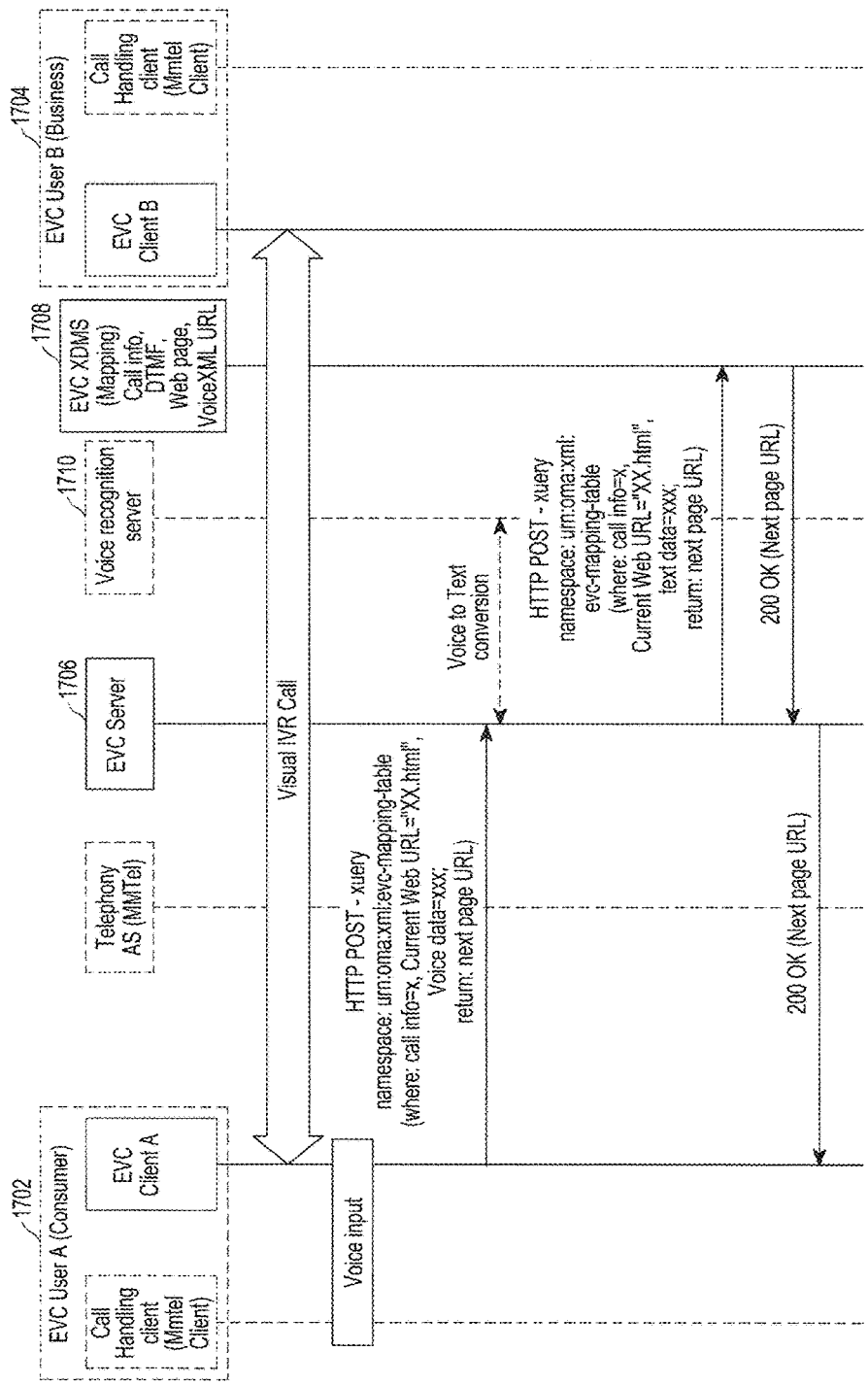
FIG. 17A is a flow diagram illustrating an exemplary method for receiving a subsequent webpage URL using a voice input provided by an EVC user A, according to one embodiment.

FIG. 17A is a flow diagram illustrating an exemplary method for receiving a subsequent webpage URL using a voice input provided by an EVC user A, according to one embodiment. Consider that a visual IVR call is ongoing between an EVC user A 1702 and EVC user B 1704, where the EVC user A 1702 is a consumer and the EVC user B 1704 is a business entity. The visual IVR content associated with visual IVR call is presented to the EVC user A 1702. The EVC user A 1702 may provide a voice input on the visual IVR content presented to the EVC user A 1702. An EVC client of the EVC user A 1702 transmits a HTTP POST xquery search request to an EVC Server 1706. The search is targeted to return a subsequent page URL from EVC XDMS 1708. The search request includes call info, current Web URL and user input, the voice data. The EVC Server 1706 converts the user input Voice data to text using a third party Voice recognition server 1710. After converting the voice data to text, the EVC server 1706 generates the HTTP POST xquery request towards the EVC XDMS 1708 with call info, Current page URL, text, and a request to get next page URL. The EVC XDMS 1708 uses a mapping table to retrieve the next page URL which is the corresponding page URL to the current page URL and transmits a "200 OK" response towards the EVC Server 1706. Accordingly, the visual IVR content relating to the subsequent page URL is presented to the user.

Figure 17B:
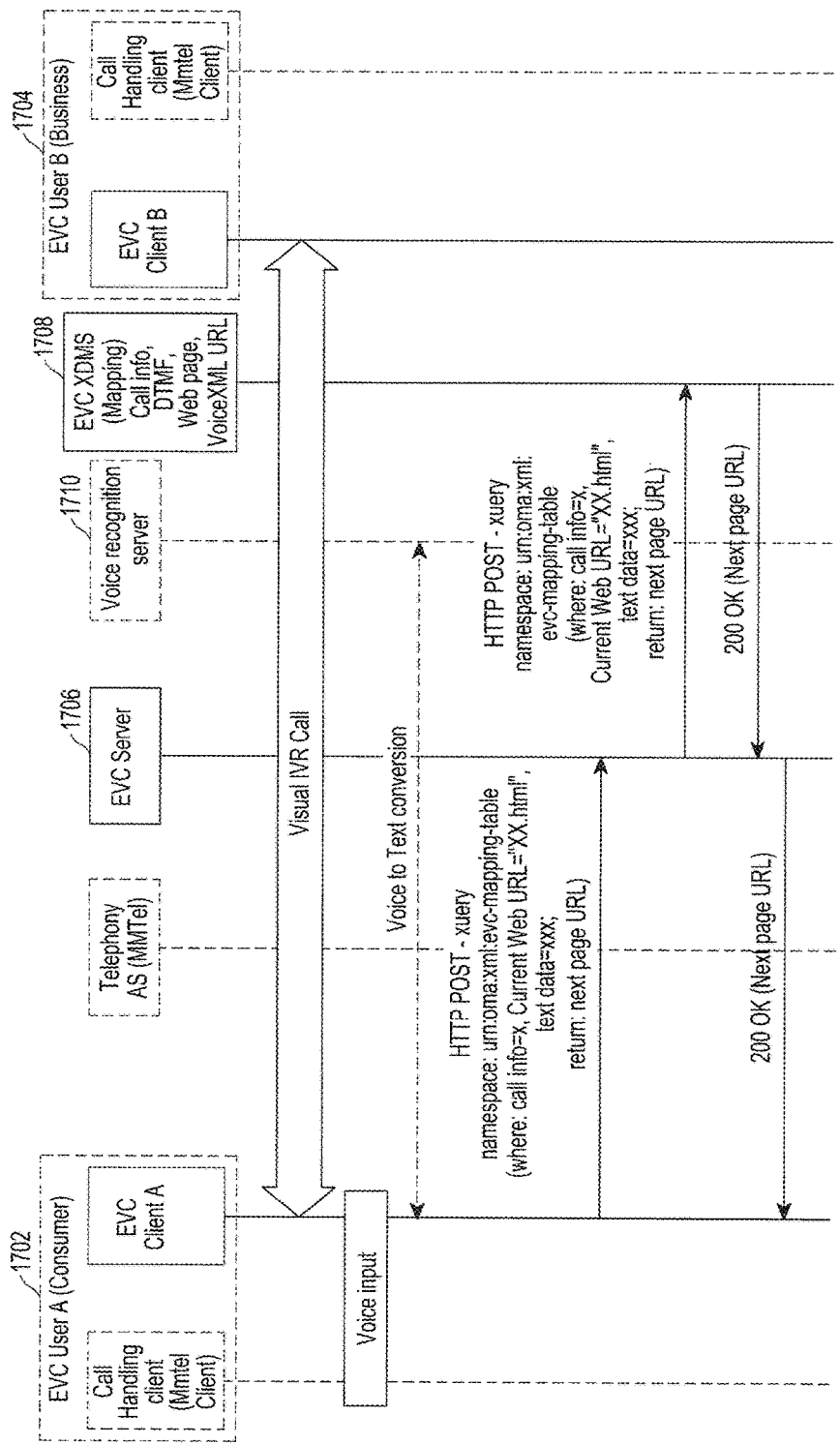
FIG. 17B is a flow diagram illustrating an exemplary method for receiving a subsequent webpage URL using a voice input provided by an EVC user A, according to another embodiment.

In an alternate embodiment, the voice input provided by the EVC user A 1702 is converted into text using a third party voice recognition server 1710. The EVC client of the EVC user A 1702 transmits a HTTP POST xquery request to the EVC Server 1706. The search is targeted to return the subsequent page URL from EVC XDMS 1708. The search request includes call info, Current Web URL, and text data. The EVC Server 1706 forwards the search request query from EVC Client A towards the EVC XDMS 1708. The EVC XDMS 1708 uses the mapping table to retrieve the next page URL which is the corresponding page URL to the current page URL and transmits in 200 OK response towards the EVC Server 1706. The EVC Server 1706 forwards visual IVR content relating to the subsequent page URL along with the 200 OK response to the EVC Client A. The same is illustrated in FIG. 17*b*.

Figure 17C:
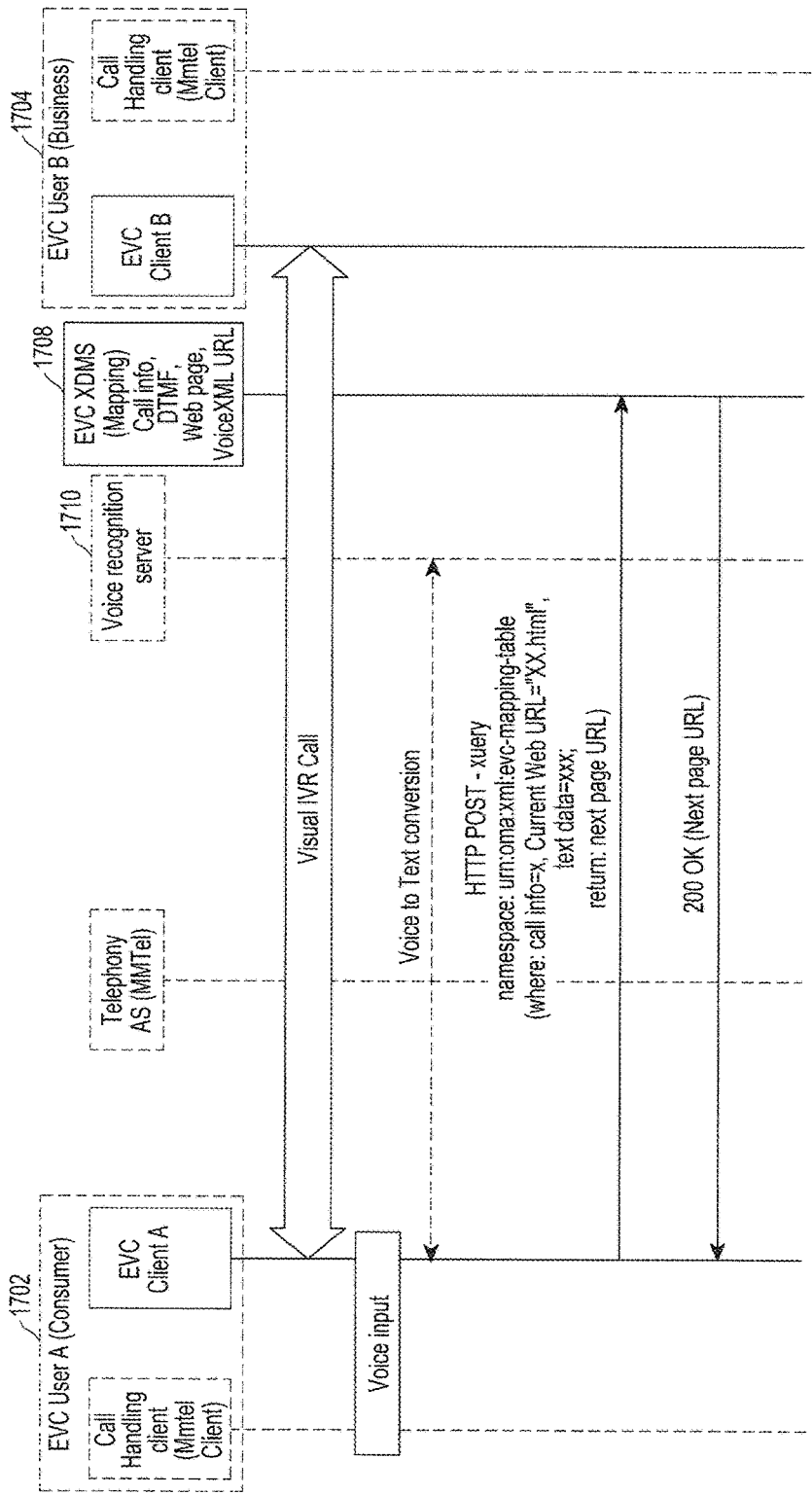
FIG. 17C is a flow diagram illustrating an exemplary method for receiving a subsequent webpage URL using a voice input provided by an EVC user A, according to yet another embodiment.

In another embodiment, EVC client of the EVC user A 1702 converts the voice data into text and generates a HTTP POST xquery request towards the EVC XDMS 1708. The search request includes call info, Current Web URL, and text data. The EVC XDMS 1708 uses a mapping table to map the received data with information stored in the mapping table to retrieve the subsequent page URL. The EVC XDMS 1708 then presents the subsequent page URL along with 200 OK response to the EVC user A 1702. The same is illustrated in FIG. 17C.

Figure 18A:
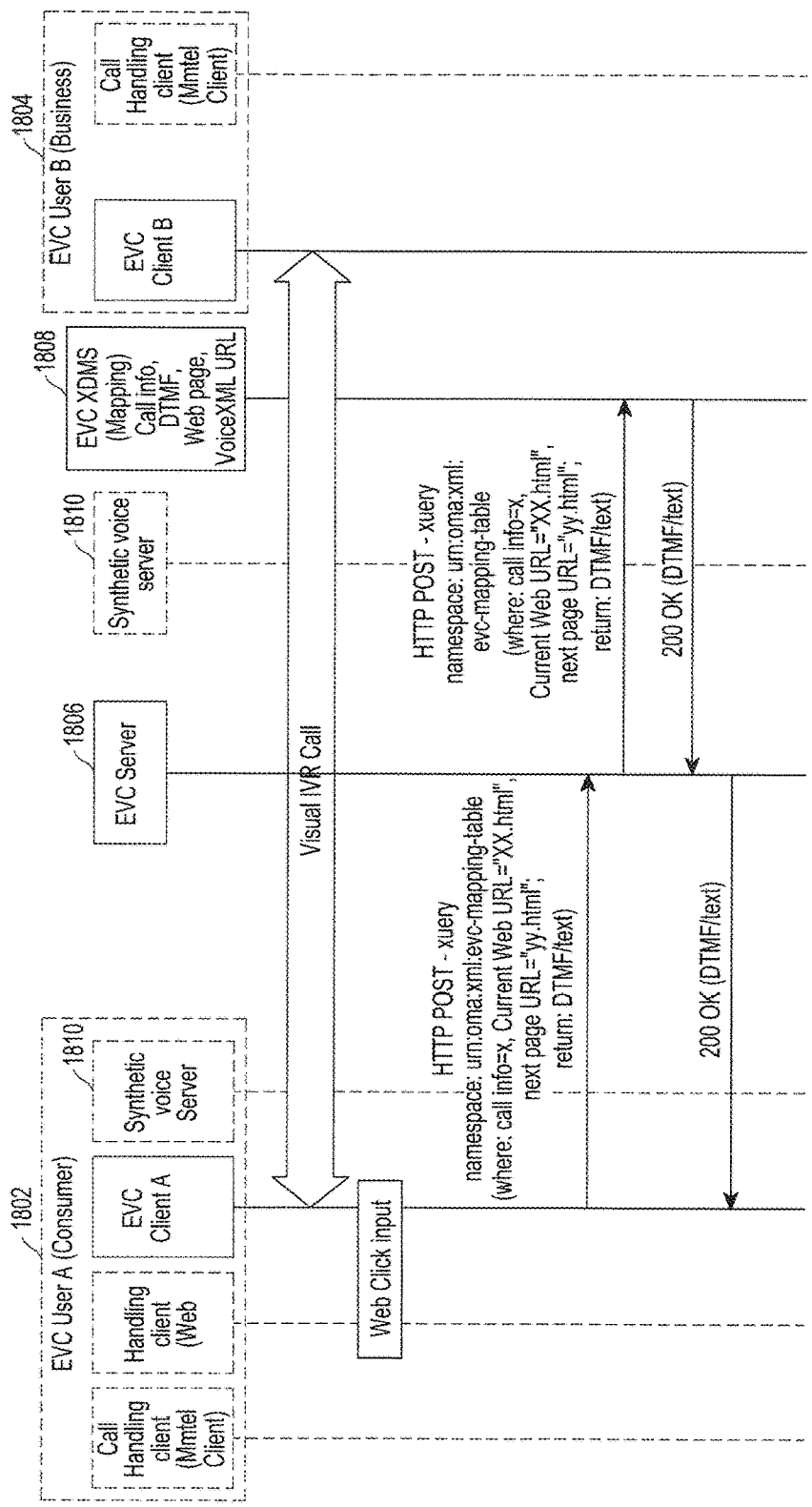
FIG. 18A is a flow diagram illustrating an exemplary method of receiving visual IVR content based on a web click input provided by an EVC user A, according to one embodiment.
Figure 18B:
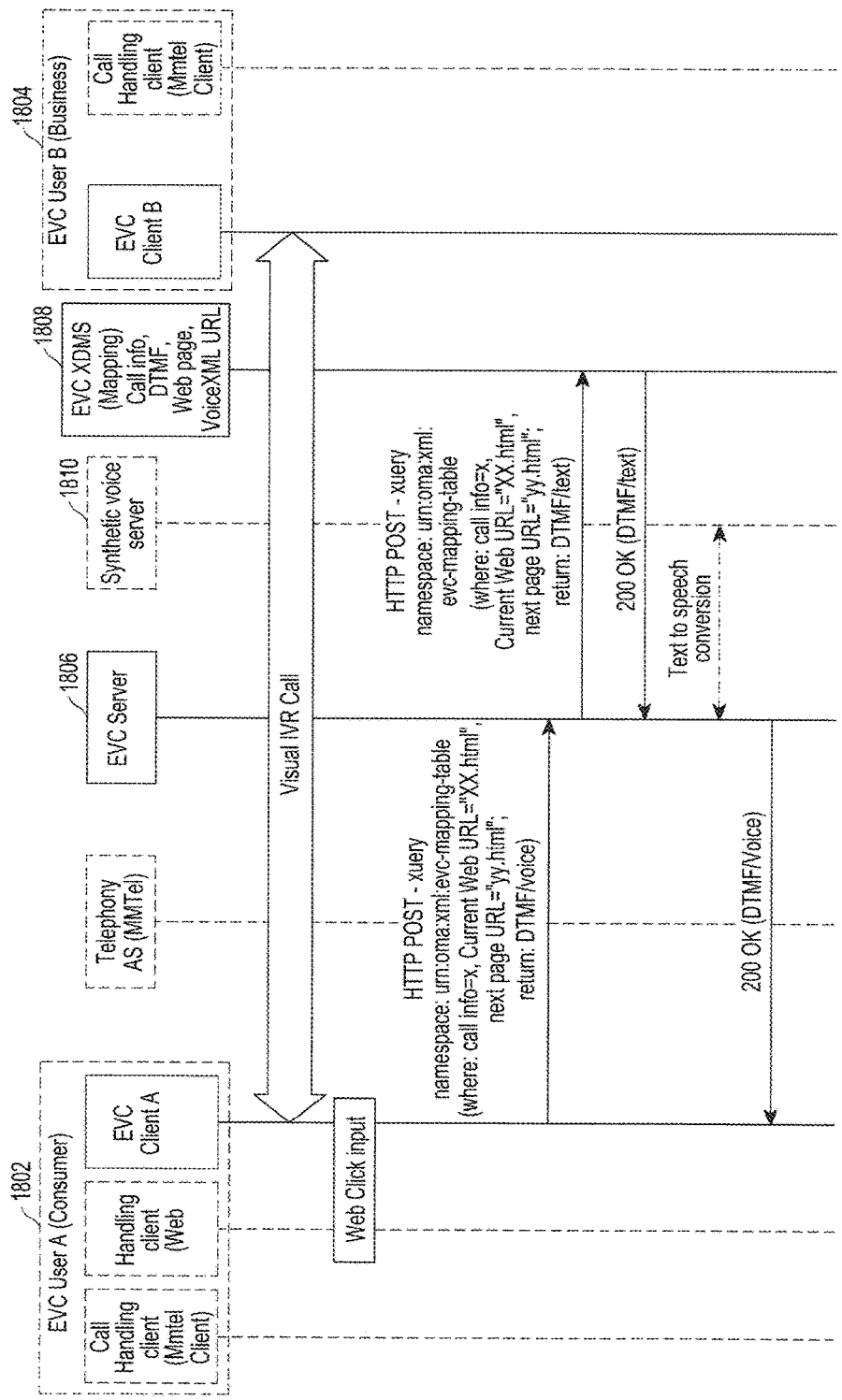
FIG. 18B is a flow diagram illustrating an exemplary method of receiving visual IVR content based on a web click input provided by an EVC user A, according to another embodiment.

FIG. 18A is a flow diagram illustrating an exemplary method of receiving visual IVR content based on a web click input provided by an EVC user A, according to one embodiment. In this embodiment, a visual IVR call session is established between an EVC user A 1802 and a EVC user B 1804 where the EVC user A 1802 is a consumer and EVC user B 1804 is a business entity. The visual IVR content relating to visual IVR call session is presented to the EVC user A 1802. The EVC user A 1802 may provide one or more input on the visual IVR content using a web click action. An EVC client of the EVC user A 1802 generates a HTTP POST xquery request towards the EVC Server 1806. The search request comprises of call info, Current Web URL, next page URL and DTMF/text associated with the web click. Since, the web click action is provided, the EVC client also provides the next page URL along with the search request. The search is targeted to return the DTMF/text from EVC XDMS 1808. The EVC Server 1806 then forwards the search request query from EVC Client A towards the EVC XDMS 1808. The EVC XDMS 1808 uses a mapping table to retrieve the DTMF/text and return in "200 OK" response towards the EVC Server 1806. The EVC server 1806 then transmits the DTMF/text in "200 OK" response to the EVC user A 1802. In an alternate embodiment, the DTMF/text from the EVC XDMS 1808 is provided to the EVC server 1806, The EVC server 1806 then converts the text to voice using a third party Synthetic Voice server 1810. The converted voice message is then transmitted to the EVC user A 1802. This is illustrated in FIG. 18*b*.

Various embodiments of the present invention is adapted to provide an IVR call experience with visual capabilities offering a rich, friendly and interactive user experience. The visual IVR system provides an interactive visual representation of the audio menu so that the EVC user does not have to keep track or memorize all the menus. Further, the visual IVR system is adapted to work with the existing systems. Hence, there is no need to alter the traditional IVR systems. The present invention also provides a new user input method "web click" apart from DTMF and voice inputs that are present in traditional IVR systems, thereby offering full backwards compatibility. Thus, the present invention provides flexibility to the user for using any of the user input options irrespective of the user input option used previously, to interact with the IVR system. The present invention further provides seamless integration of voice and visual menus.

Although the invention of the method and system has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

The invention claimed is:

1. A method for providing visual interactive voice response (VIVR) content to an enhanced visual call (EVC) client device, the method comprising:
   receiving, by an EVC server, a request from the EVC client device for providing the visual IVR content, wherein the request comprises of information of a called interactive voice response (IVR) system, a current webpage uniform resource locator (URL) and an EVC user input;
   mapping, by the EVC server, the received information of the called IVR system, the current webpage URL and the EVC user input with at least one of a subsequent webpage uniform resource locator (URL) and an input value for the IVR system stored in a EVC extensible markup language document management (XDM) server; and
   transmitting, to the EVC client device, information of the input value for the IVR system.

2. The method as claimed in claim 1, wherein the current webpage URL is NULL or void.

3. The method as claimed in claim 1, wherein the EVC user input is NULL or void.

4. The method as claimed in claim 1, further comprising:
   receiving, by the EVC server, a request from the EVC client device for providing subsequent visual IVR content, wherein the request comprises of details of the called IVR system, the current webpage URL and one or more options selected by the EVC user; and
   mapping, by the EVC server, the received information of the called IVR system, the current webpage URL and the EVC user input with the subsequent webpage uniform resource locator (URL) and an input value stored in a EVC XDM server.

5. The method as claimed in claim 4, wherein the EVC user input comprises of one or more options for enabling a user to interact or navigate through the visual IVR.

6. The method as claimed in claim 5, wherein the EVC user input comprises at least one of:
   a dual tone multi frequency (DTMF) tone input;
   a voice input; or
   a web click input.

7. The method as claimed in claim 1, wherein the IVR system supported by the EVC server comprises at least one of:
   an IVR system capable of handling a DTMF tone;
   an IVR system capable of handling a Voice tone; and
   an IVR system capable of handling both DTMF tone and voice tone.

8. The method as claimed in claim 1, wherein mapping the received information of the called IVR system, the current webpage URL and the EVC user input with the visual IVR content comprises of:

transmitting, by the EVC server, a request to the EVC XDM server for obtaining the visual IVR content;

retrieving visual IVR mapping information related to the IVR system stored in a mapping table; and receiving the mapping information from the EVC XDM server.

9. The method as claimed in claim 8, wherein the mapping table comprises at least one of:

the current webpage URL corresponding to a current visual IVR content to be displayed to the EVC client device;

the subsequent webpage URL pointing to the next VIVR content to be displayed to the EVC client device;

a DTMF Code for retrieving a corresponding web content or text content; and a mapping text for retrieving a corresponding audio content or web content.

10. An enhanced visual call (EVC) server for providing a visual interactive voice response (VIVR) content to an enhanced visual call (EVC) client device, the EVC server comprising:

a transceiver configured to:

receive a request from the EVC client device for providing the VIVR content, wherein the request comprises information of a called interactive voice response (IVR) system, current webpage uniform resource locator (URL) and an EVC user input, and transmit information of an input value for the IVR system to the EVC client device; and a controller configured to receive information of the called IVR system, the current webpage URL and the EVC user input with at least one of a subsequent webpage uniform resource locator (URL) and the input value for the IVR system stored in a EVC extensible markup language document management (XDM) server.

11. The EVC server as claimed in claim 10, wherein the current webpage URL is NULL or void.

12. The EVC server as claimed in claim 10, wherein the EVC user input is NULL or void.

13. The EVC server as claimed in claim 10, the transceiver further configured to receive a request from the EVC client device for providing subsequent visual IVR content, wherein the request comprises of details of the called IVR system, the current webpage URL and one or more options selected by the EVC user; and the controller further configured to map the received information of the called IVR system, the current webpage URL and the EVC user input with a subsequent webpage uniform resource locator (URL) and an input value stored in a EVC XDM server.

14. The EVC server as claimed in claim 13, wherein the EVC user input comprises of one or more options for enabling a user to interact or navigate through the visual IVR.

15. The EVC server as claimed in claim 14, wherein the EVC user input comprises at least one of:

a dual tone multi frequency (DTMF) tone input;

a voice input; or a web click input.

16. The EVC server as claimed in claim 10, wherein the IVR system supported by the EVC server comprises at least one of:

an IVR system capable of handling a DTMF tone;

an IVR system capable of handling a Voice tone; and an IVR system capable of handling both DTMF tone and voice tone.

17. The EVC server as claimed in claim 10:

the controller further configured to retrieve a visual IVR mapping information related to the IVR system stored in a mapping table; and the transceiver further configured to transmit a request to a EVC XDM server for obtaining the VIVR content and receiving the mapping information.

18. The EVC server as claimed in claim 17, wherein the mapping table comprises at least one of:

the current webpage URL corresponding to a current visual IVR content to be displayed to the EVC client device;

a subsequent webpage URL pointing to the next VIVR content to be displayed to the EVC client device;

a DTMF Code for retrieving a corresponding web content or text content; and a mapping text for retrieving a corresponding audio content or web content.

19. An enhanced visual call (EVC) client device for providing a visual interactive voice response (VIVR) content to a EVC user, the EVC client device comprising:

a transceiver configured to:

transmit a request for providing the VIVR content, wherein the request comprises information of a called interactive voice response (IVR) system, a current webpage uniform resource locator (URL) and an EVC user input, and receive a subsequent webpage URL associated with the VIVR content stored on a content server or an input value for the IVR system from an EVC extensible markup language document management (XDM) server, in response to the request; and a controller configured to:

retrieve the VIVR content associated with the webpage URL from the content server, provide an EVC user input or the input value received from the EVC XDM server to the IVR system, and present the retrieved VIVR content, in synchronization with a corresponding audio from the IVR system, along with the corresponding audio simultaneously on the EVC client device, wherein the information of the called IVR system, the current webpage URL and the EVC user input are mapped with at least one of the subsequent webpage URL and the input value stored in the EVC XDM server.

20. The EVC client device as claimed in claim 19:

the controller further configured to retrieve a subsequent VIVR content associated with the subsequent webpage URL based on one or more options selected by the EVC client device, provide the user input received from the EVC client device or the input value received from the EVC XDM server to the IVR system, and render the subsequent VIVR content, in synchronization with a corresponding audio IVR, along with the corresponding audio IVR on the EVC client device.

21. The EVC client device as claimed in claim 19, further configured to:

allow the EVC client device to share web content while triggering an IVR call.

22. The EVC client device as claimed in claim 21, the EVC client device for sharing web content while triggering the IVR call includes a first EVC client device and a second EVC client device;
   the first EVC client device configured to:
      fetch a landing webpage associated with a second EVC client device for accessing the landing webpage associated with the second EVC client device, update content of the landing webpage associated with the second EVC client device, obtain a reference ID or uniform resource locator (URL) for the updated landing webpage content, initiate an enriched call setup for sharing the reference ID or URL obtained for the updated landing webpage content; and
   the second EVC client device configured to:
      extract call correlation information and EVC data including reference ID for the webpage content accessed by the first EVC client device, obtain enriched content from a content server based on the reference ID, and correlate the enriched content and the call and provide the correlated enriched content and call to the second EVC client device.

23. The EVC client device as claimed in claim 22, wherein the second EVC client device for updating the landing webpage content associated with the second EVC client device further configured to:
   allow the first EVC client device to fill one or more details provided in the landing webpage content associated with the second EVC client device.

24. A method for providing visual interactive voice response (VIVR) content to an enhanced visual call (EVC) user, the method comprising:
   transmitting, by an EVC client device, a request for providing the VIVR content, wherein the request comprises of information of a called interactive voice response (IVR) system, a current webpage uniform resource locator (URL) and an EVC user input;
   receiving, by the EVC client device, a subsequent webpage URL associated with the VIVR content stored on a content server or an input value for the IVR system from an EVC extensible markup language document management (XDM) server, in response to the request;
   retrieving, by the EVC client device, the VIVR content associated with the webpage URL from the content server;
   providing, by the EVC client device, the EVC user input or the input value received from the EVC XDM server, to the IVR system; and
   presenting the retrieved VIVR content, in synchronization with a corresponding audio from the IVR system, along with the corresponding audio simultaneously on the EVC client device,
   wherein the information of the called IVR system, the current webpage URL and the EVC user input are mapped with at least one of the subsequent webpage URL and the input value stored in the EVC XDM server.

25. The method as claimed in claim 24, further comprising:
   retrieving, by the EVC client device, a subsequent VIVR content associated with a subsequent webpage URL based on one or more options selected by the EVC user;
   providing, by the EVC client device, the EVC user input received from the EVC user or the input value received from the EVC XDM server to the IVR system; and
   rendering the subsequent VIVR content, in synchronization with a corresponding audio IVR, along with the corresponding audio IVR on the EVC client device.

26. The method as claimed in claim 24, further comprising:
   allowing the EVC user to share web content while triggering an IVR call.

27. The method as claimed in claim 26, wherein the step of sharing web content while triggering the IVR call comprises:
   fetching, by a first EVC client device, a landing webpage associated with a second EVC user for accessing a landing webpage associated with the second EVC user;
   updating, by the first EVC client device, content of the landing webpage associated with the second EVC user;
   obtaining, by the first EVC client device, a reference ID or uniform resource locator (URL) for the updated landing webpage content;
   initiating, by the first EVC client device, an enriched call setup for sharing the reference ID or URL obtained for the updated landing webpage content;
   extracting, by a second EVC client device, call correlation information and EVC data including reference ID for the webpage content accessed by the first EVC client device;
   obtaining, by a second EVC client device, enriched content from a content server based on the reference ID; and
   correlating, by a second EVC client device, enriched content and the call and providing the correlated enriched content and call to the second EVC user.

28. The method as claimed in claim 27, wherein updating the landing webpage content associated with the second EVC user comprises:
   allowing the EVC user to fill one or more details provided in the landing webpage content associated with the second EVC user.

* * * * *